United States Patent
Mercat et al.

(10) Patent No.: US 8,162,407 B2
(45) Date of Patent: Apr. 24, 2012

(54) SPOKED WHEEL

(75) Inventors: Jean-Pierre Mercat, Chavanod (FR); Olivier Mouzin, Montmin (FR)

(73) Assignee: Salomon S.A.S., Metz-Tessy (FR)

( * ) Notice: Subject to any disclaimer, the term of this patent is extended or adjusted under 35 U.S.C. 154(b) by 0 days.

(21) Appl. No.: 12/300,585

(22) PCT Filed: May 4, 2007

(86) PCT No.: PCT/FR2007/000767
§ 371 (c)(1), (2), (4) Date: Nov. 12, 2008

(87) PCT Pub. No.: WO2007/135259
PCT Pub. Date: Nov. 29, 2007

(65) Prior Publication Data
US 2009/0184565 A1    Jul. 23, 2009

(30) Foreign Application Priority Data

May 12, 2006   (FR) ..................... 06 04237

(51) Int. Cl.
*B60B 1/02* (2006.01)
(52) U.S. Cl. .............................. 301/58; 301/59; 301/104
(58) Field of Classification Search ............... 301/104, 301/54–56, 58–61, 67–68, 74–75, 79
See application file for complete search history.

(56) References Cited

U.S. PATENT DOCUMENTS

| | | | | |
|---|---|---|---|---|
| 1,433,435 A | * | 10/1922 | Van Horn | 301/74 |
| 5,110,190 A | * | 5/1992 | Johnson | 301/55 |
| 5,350,221 A | * | 9/1994 | Pearce et al. | 301/104 |
| 6,189,978 B1 | | 2/2001 | Lacombe et al. | |
| 6,196,638 B1 | | 3/2001 | Mizuno et al. | |
| 6,588,853 B2 | | 7/2003 | Okajima | |
| 2002/0074853 A1 | | 6/2002 | Krampera | |
| 2003/0038530 A1 | * | 2/2003 | Meggiolan | 301/55 |
| 2003/0234571 A1 | | 12/2003 | Okajima | |
| 2004/0026986 A1 | * | 2/2004 | Jager | 301/58 |
| 2006/0108858 A1 | | 5/2006 | Mercat et al. | |
| 2009/0160243 A1 | * | 6/2009 | Mercat et al. | 301/75 |

FOREIGN PATENT DOCUMENTS

| | | |
|---|---|---|
| CH | 91 759 A | 11/1921 |
| DE | 200 17 074 U1 | 2/2002 |
| EP | 0 896 886 A1 | 2/1999 |
| EP | 1 016 552 A2 | 7/2000 |
| EP | 1 216 849 A2 | 6/2002 |
| EP | 1 283 112 A1 | 2/2003 |
| EP | 1 316 442 A2 | 6/2003 |
| EP | 1 375 195 A2 | 1/2004 |
| FR | 1 019 285 A | 1/1953 |
| FR | 2 701 899 A1 | 9/1994 |

(Continued)

*Primary Examiner* — Jason Bellinger
(74) *Attorney, Agent, or Firm* — Greenblum & Bernstein, P.L.C.

(57) ABSTRACT

The invention relates to a spoked wheel that includes a peripheral rim, a central hub, and individual connecting spokes between the rim and the hub, the spokes being taut. The wheel includes an arrangement for adjusting the tension of at least some of the spokes, and the spokes are taut with an initial tension Ti corresponding to a normal tension value Tn which is reduced by a value corresponding to a compression force R that can be supported by each spoke. For a rear wheel, the spokes supporting the compression forces are those arranged on the side opposite freewheel.

33 Claims, 15 Drawing Sheets

FOREIGN PATENT DOCUMENTS

| | | |
|---|---|---|
| GB | 144 541 A | 6/1920 |
| WO | WO-03/018331 A1 | 3/2003 |
| WO | WO-2004/332231 A2 | 4/2004 |
| WO | WO-2004/108515 A1 | 12/2004 |
| WO | WO-2007/135260 A1 | 11/2007 |

* cited by examiner

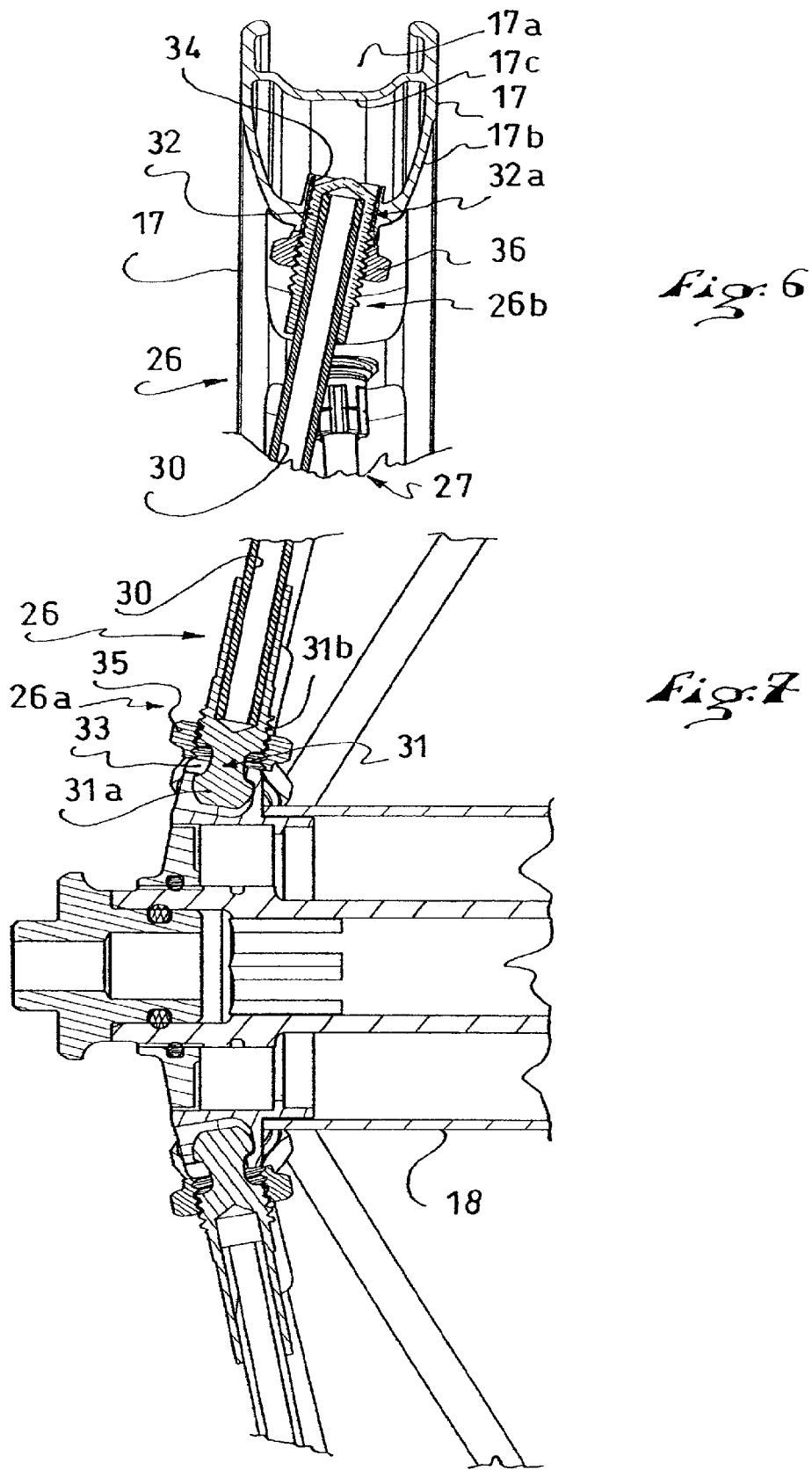

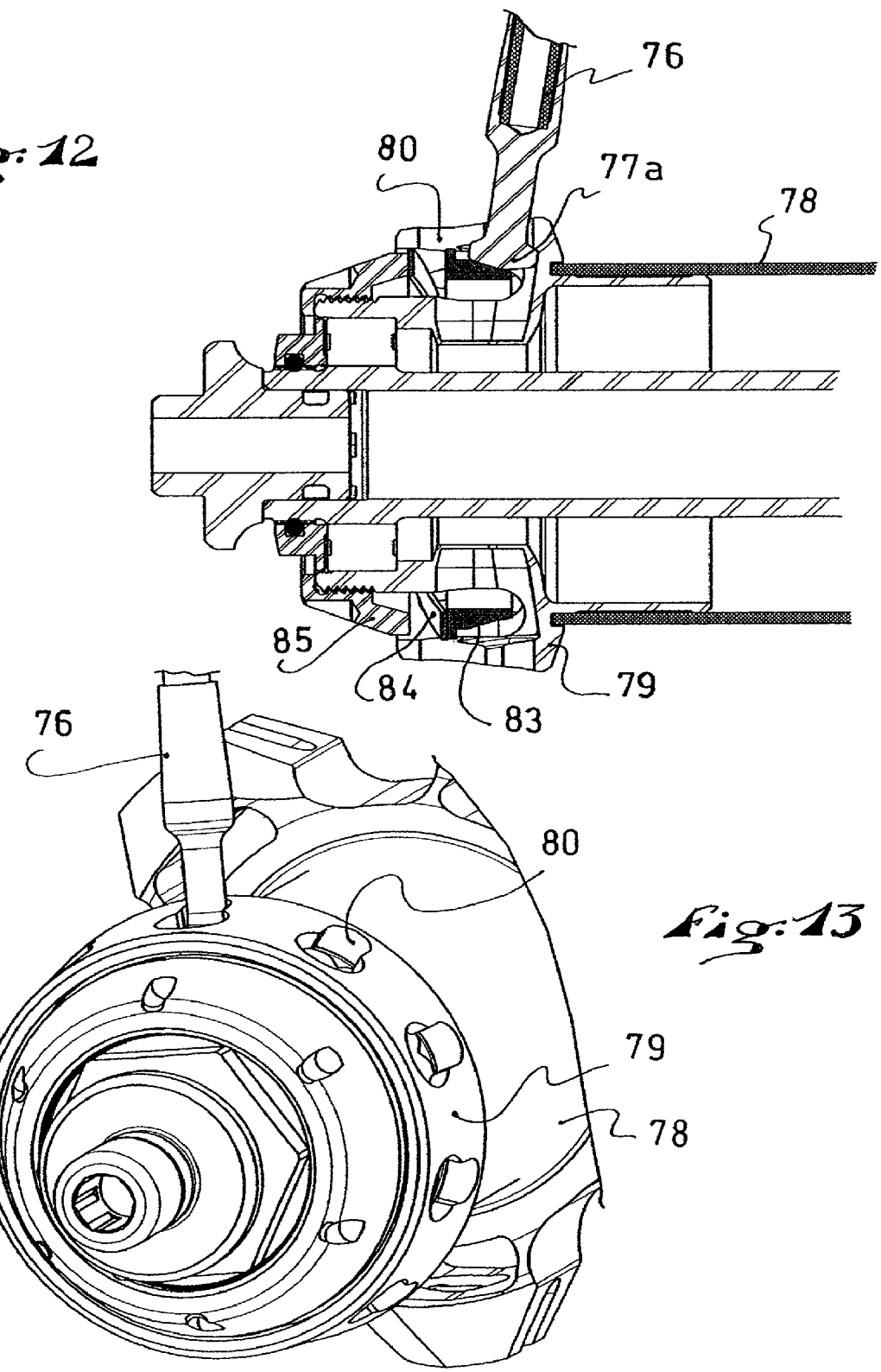

SPOKED WHEEL

BACKGROUND OF THE INVENTION

1. Field of the Invention

The invention relates to a spoke for a spoked wheel, in particular a cycle wheel. The invention also relates to a spoked wheel having at least one such spoke, as well as to a rolling apparatus, in particular a cycle, equipped with at least one such wheel.

2. Description of Background and Other Information

The wheel has existed since the mists of time. The first wheels were solid wheels. A first improvement consisted in building compression spoke wheels, which were lighter. The spokes of such wheels were biased in compression and in flexion by a rim. Then, the wheel was ringed by a metal hoop and the compression spokes were pre-stressed in compression. The patent document CH 91759 describes such a mode of construction method.

The invention of the tension wire spoke wheel goes back to around 1866, and is credited to Eugene Meyer. This invention made it possible to build wheels with spokes having a considerably decreased cross section, resulting in a substantial weight reduction. It also became possible to increase the wheel diameter, and therefore to increase its size, as was the case with the steel high-wheels whose pedals were in direct engagement with the driving wheel. The terms "traction" and "tension" are used interchangeably herein to describe a spoke having a positive tension.

Conventionally, a currently available spoke wheel includes a peripheral rim provided to receive a tire, a central hub and connecting spokes between the rim and the hub. The number of spokes is variable depending upon the type of wheels; it generally varies between twelve and forty. As a general rule, the spokes are distributed in two sets, each of which connects the rim to a respective one the ends of the hub. The spokes of each set form an angle with the median plane of the rim, which is commonly referred to as the dish angle.

The spokes structurally connect the rim and the hub, which makes it possible to provide the wheel with good rigidity and good fatigue strength. The external loads to which a wheel is subjected during use can be divided into a radial force directed along the median plane of the rim, a lateral force directed perpendicular to such plane, and a motive force or, conversely, a braking force tangent to the wheel circle, which corresponds to the transmission of torque between the hub and the rim.

Constructions of wheels other than tension spoke wheels currently exist. For example, solid wheels or so-called compression spoke wheels are known, which are made out of composite material and are used mainly for their aerodynamic properties. The patent documents WO 2004/033231 and FR 2701899 describe such wheels. There are also molded wheels made out of light alloy (aluminum, magnesium or titanium). Such wheels are known, for example, from patent documents EP 1016552 and WO 2004/108515.

However, among these various wheel modes of construction, the tension spoke wheel still offers the best compromise between lightness and strength, provided that it is well built and properly adjusted.

It is commonly believed that the more tensioned the spokes, the more rigid the wheel. However, this belief is erroneous because excessive tension in the spokes in fact makes the wheel more flexible and also weakens it. Indeed, the risk of causing the rim to buckle under the compressive stress produced by the spokes increases substantially if the spokes are overly tensioned, i.e., overly tightened. Another problem related to excessive spoke tension is the variation in the wheel diameter before and after tensioning. Contrary to the common preconceived notion that the wheel spokes must be tensioned to the maximum, one of the problems associated with tension spoke wheels therefore resides in the application of correct, not excessive, tension.

In general, it is believed that spoke tension must be sufficient, so that none of the spokes becomes loose during normal use of the wheel. Indeed, a spoke that becomes temporarily loose becomes non-existent in relation to the rim and the other spokes; and the wheel consequently loses rigidity locally.

The rim, the hub, and the spokes must be considered as a structure in which the forces are balanced. The tension of each spoke is taken up by the hub, the rim, and the other spokes. A force applied to the hub or the rim is reflected on all of the spokes. For a rear wheel, it is also necessary to take into account the tension level that is different in the spokes located on the side of the freewheel and the spokes located on the side opposite the freewheel, due to the difference in the dish angle between the two sets. Finally, depending upon the orientation of the spokes in the set, and depending upon whether the spoking pattern is radial or crossed, in particular, the spoke tension can be different. When a spoked wheel is built, the spokes are sufficiently tensioned so as not to become loose during normal use.

Thus, it is generally believed that a wheel must be capable of withstanding the following loads without any spoke loosening:
- at least 1500 Newtons of radial force for a rear wheel, 1200 Newtons for a front wheel,
- at least 200 Newtons of lateral force,
- at least 150 Newton-meters (Nm) of drive torque for the rear wheel,
- at least 300 Nm of braking torque for a front wheel with a brake system on the hub, and 150 Nm for a rear wheel of the same type.

These values are given for information only and are not limiting. Indeed, they depend on the activity involved and also on the size of the cyclist.

Another reason that a spoke must be constantly tensioned is that a spoke has a very small cross section compared to its length. If the tension becomes negative, i.e., if the spoke stress turns into compression, the spoke buckles immediately.

A tension spoke wheel yields good results, but nevertheless has several disadvantages.

First, the spoke tension produces compressive stresses in the rim body. It is estimated that for a road bike wheel having 36 spokes, with each spoke being tensioned to 1000 Newtons, the compressive force resulting in the area of the rim body is 5730 Newtons, which results in a compressive force of 88 MegaPascals (MPa), which, for a material commonly used for a rim (aluminum 6106, for example), already represents 40% of the material inherent strength potential (220 MPa). In other words, this resultant compression already weakens the rim considerably.

In addition, for a rim 622 millimeters (mm) in diameter, this compressive force leads to a reduction in the rim perimeter of up to 2.5 mm, which, naturally, can have an impact on the connection between the rim and the tire, and can lead to ill-timed tire roll offs and accidents.

Second, the spoke tension is exerted on the rim locally. Each spoke, via its tension, produces a local shearing force in the area of its attachment zone, as well a variable bending moment between each spoke hole. The bending moment leads to a polygonal deformation of the rim, commonly referred to as a "jump", with a local lateral run-out or deformation in the area of each spoke attachment zone.

The patent documents EP 1316442 and FR 1019285, providing for paired spoking patterns, illustrate these two phenomena for which they attempt to find a solution. It is noted in passing that attaching the spokes by pairs in the area of the rim, as described in the document EP 1316442, does attenuate the effect of lateral run-out, but accentuates the polygonal effect.

To solve this problem, EP 1316442 proposes to start with a rim that is pre-deformed in an opposite configuration (see FIG. 5 of this patent), which is difficult to implement.

Lastly, it has been observed that the service life of a wheel, i.e., of each of its components, is substantially inversely proportional to the tension of the spokes. During wheel rotation, each spoke is subject to a loading and unloading cycle, and each spoke locally subjects the rim to such a loading and unloading cycle. These repeated cycles result in damage to the spoke or the rim, and this all the more quickly as the tension in the spoke is high. Consequently, the currently available tension spoke wheels do not have an optimal service life. In view of this state of the art, there exists a need for a wheel construction that reconciles rigidity, strength, and optimal service life.

There also exists a need for a wheel whose geometrical characteristics (lateral run-out or deformation, jump, perimeter) remain as stable as possible.

SUMMARY OF THE INVENTION

The aforementioned objects, as well as other objects, which will become apparent from the description that follows, are achieved by the invention.

In particular, the spoked wheel according to the invention, which includes a peripheral rim, a central hub, and individual connecting spokes between the rim and the hub, with the spokes being tensioned, includes an arrangement for adjusting at least a plurality of the spokes, the spokes being tensioned with an initial tension Ti corresponding to a normal tension value Tn which is reduced by a value R corresponding to a compressive force that each spoke can withstand. Consequently, and contrary to the common preconceived notion, the spokes work alternatively in tension and compression and, therefore, need to be much less tensioned. The geometrical characteristics and the service life of the wheel are thereby substantially improved.

BRIEF DESCRIPTION OF THE DRAWINGS

In any event, the invention will be better understood with reference to the description below and the schematic drawings annexed thereto, and in which:

FIG. 6 illustrates the attachment of the spoke of FIG. 5 to the rim.

FIG. 7 shows the attachment of the spoke of FIG. 5 to the hub.

FIGS. 9 to 13 illustrate various alternative embodiments related to the attachment of the spokes to the hub.

DETAILED DESCRIPTION OF THE INVENTION

Figure 4:
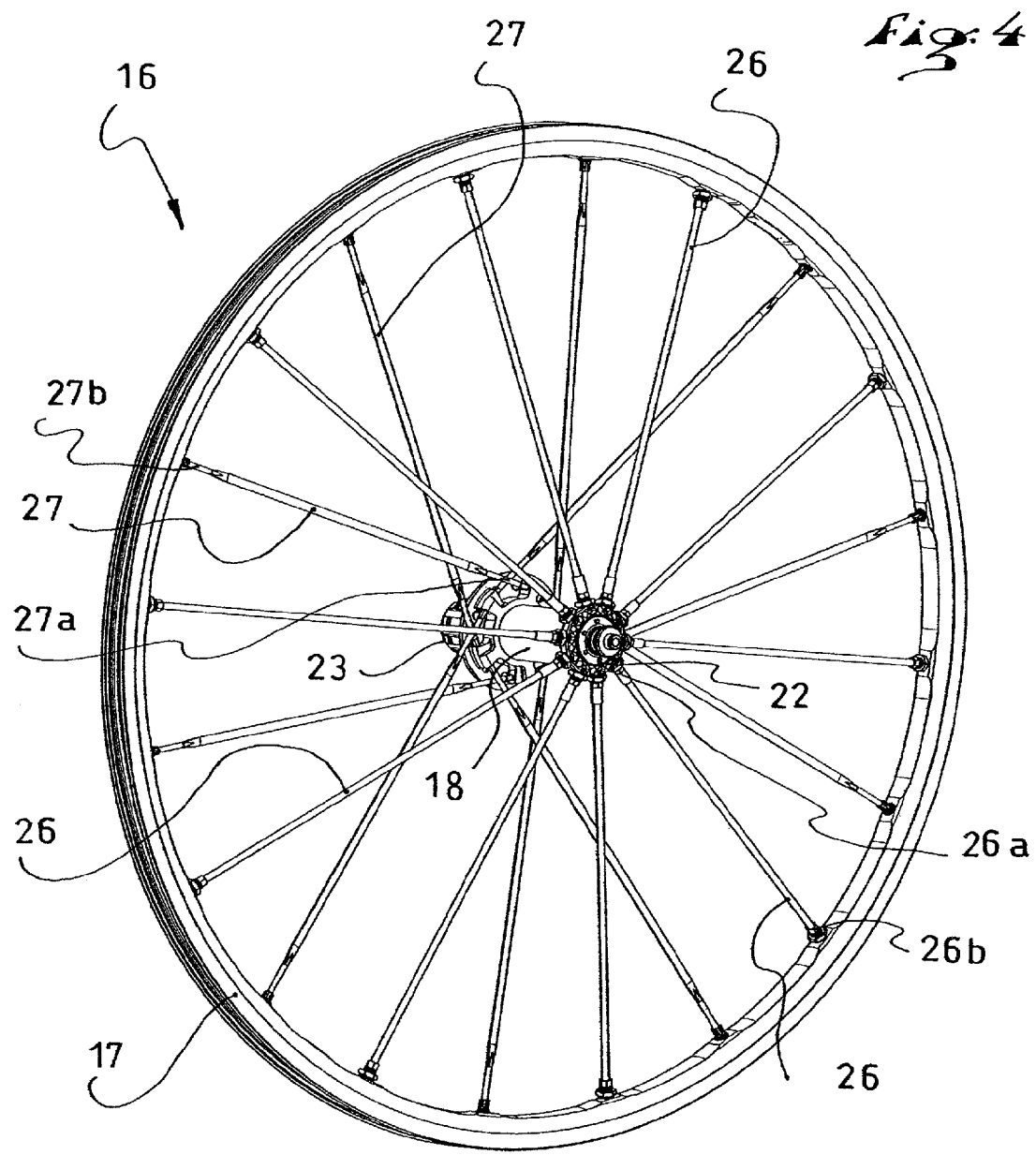
FIG. 4 is a perspective view of a rear wheel according to a non-limiting embodiment of the invention.

The wheel 16 shown in FIG. 4 is a rear wheel. Conventionally, the wheel 16 includes a peripheral rim 17, a central hub 18, and connecting spokes 26, 27 between the rim and the hub. The rim 17 is of any appropriate type. In the particular illustrated embodiment, and with additional reference to FIGS. 6 and 7, the rim has a hollow box-structure with a channel 17a for receiving a tire on its periphery, and two side walls 17b joined together by one or more bridges 17c. The spokes 26, 27 have an elongated body that defines a longitudinal, or length-wise, direction for each spoke, and two attachment ends 26a, 26b and 27a, 27b, respectively, by means of which which they are attached to the hub, on one side, and to the rim, on the other side.

The hub 18 has two axial ends 22 and 23. One of the ends, in this case the end 23, carries a transmission freewheel, the body of which is seen in the background in FIG. 4. The spokes 26, 27 are distributed in two sets, the spokes of each set being attached to one end 22, 23 of the hub. One of the sets is made up of spokes 26 attached to the end 22 opposite the freewheel. The other spoke set is made up of spokes 27 attached to the hub end 23 located on the freewheel side. Due to the presence of the freewheel body, the set of spokes 27 is more flattened than the set of spokes 26, because its spokes form a dish angle with the median radial plane of the rim, which is smaller than the angle formed by the spokes 26 and the median radial plane. This is known in the state of art.

FIG. 4 shows crossed spokes 27 on the freewheel side, and radial spokes 26 on the side opposite the freewheel. This is not limiting, and any other spoke pattern can be implemented within the scope of the invention. In particular, a crossed spoke pattern can be used for each of the two sets, or a radial spoke pattern can be used on the freewheel side and a criss-crossed spoke pattern can be used on the opposite side. Alternatively, the rim cross section could be asymmetrical.

The rim 17 is balanced with respect to the hub 18 due to the connection forces that are transmitted via the spokes 26, 27 of the two sets. The balance is radial and axial, i.e., the components of the radial and axial forces that the spokes exert on the rim or the hub have a zero resultant. In view of the difference in dish angles, the spokes 27 of the set on the freewheel side are further stressed than the spokes 26 of the other set, in order to achieve axial balance of the rim.

According to one characteristic of the invention, at least the spokes 26, on the side opposite the freewheel, are provided to resist compressive stress, and the overall level of spoke tension is lowered at least on the side opposite the freewheel.

Figure 1:
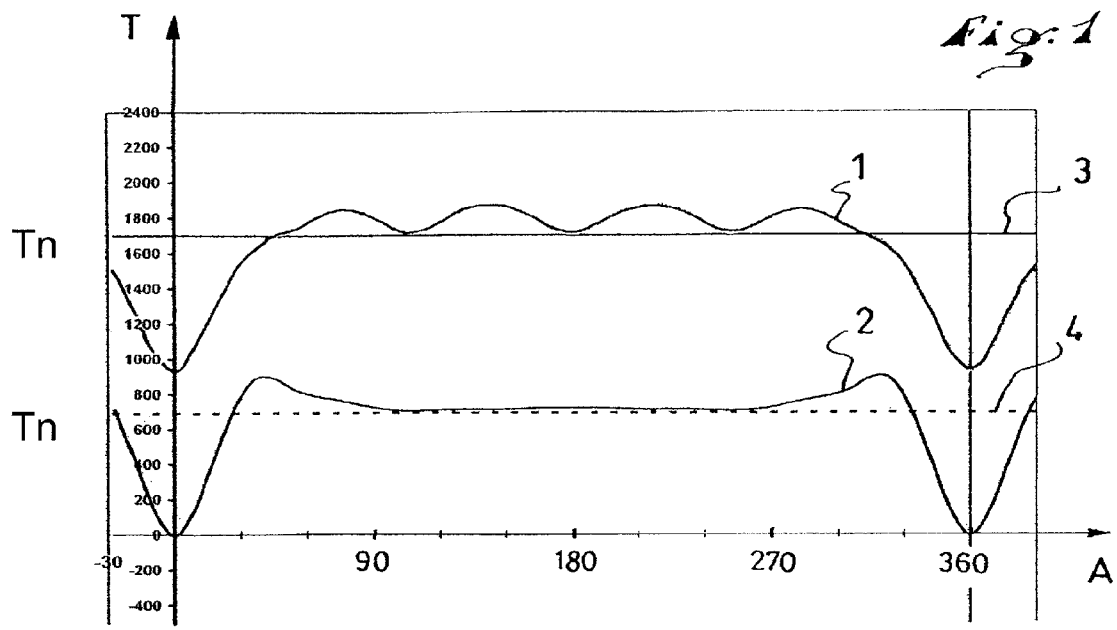
FIGS. 1 to 2 illustrate diagrams of variation in the spoke tension according to various loading methods for a conventional wheel.
Figure 2:
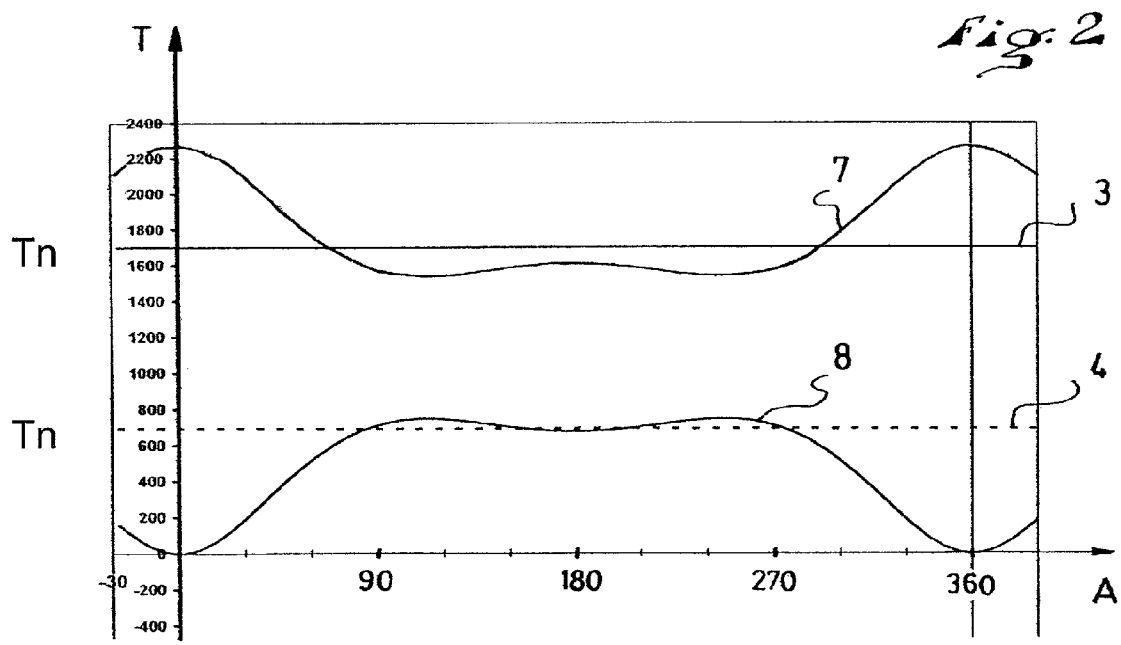

Indeed, FIGS. 1 to 2 illustrate diagrams of variation in tension in the spokes according to various wheel loading methods, radial and lateral, respectively, for a conventional tension spoke wheel.

The radial load is the prominent type of force on a wheel. Radial load tests were conducted on a rear wheel having twenty spokes was radially loaded to 1500 Newtons. The tension T of a spoke was measured throughout the revolution of the spoke around the hub. FIG. 1 illustrates the diagrams of the variation in the tension T as a function of the rotational angle A measured in a spoke of the set of spokes located on the freewheel side (curve 1) and a spoke of the set of spokes located on the side opposite the freewheel (curve 2) in a normal wheel. In this figure, the horizontal straight lines 3 and 4 correspond to the initial tension of the spokes in the absence of an external load, namely, 1700 N and 692 N, respectively. The radial load of 1500 Newtons was adjusted as a function of the initial tension of the spokes so that the minimal tension of a spoke located on the side opposite the freewheel passes through a zero minimum value recorded at 0 and 360 degrees (see curve 2). It can be seen that this tension is minimal when the spoke is directed in the direction of the support surface. A progressive variation of tension in a 35-degree range is observed on both sides of this position. Tension in the spoke is otherwise relatively constant.

The diagram and the values indicated do not have any limiting value; they are given only to illustrate the problem underlying the invention.

FIG. 2 illustrates alternative tensions in the spokes of a conventional wheel for a lateral loading.

The lateral loading occurs on a wheel when the cyclist is standing on the pedals or when the bicycle leans in a curve. The preceding wheel was stressed on a test stand, with a lateral load of 244 Newtons exerted on the rim and directed from the freewheel side toward the opposite side. The tension of a spoke was measured throughout the revolution of the spoke around the wheel. The curve 7 represents the variations in the tension of a spoke of the set of spokes on the freewheel side, and the curve 8 represents that of a spoke of the set of spokes opposite the freewheel side. An increase in the tension of the spokes located on the freewheel side (curve 7 of FIG. 2), and a loosening of the spokes located on the opposite side (curve 8) are noted in the force application zone. The tension variation is at a maximum in the load application zone, and there is a progressive tension variation in a 90-degree range on both sides of the load application zone. If the sign of the lateral load applied is changed, the risk of a spoke loosening is very low, because the loosening then affects the spoke set on the freewheel side, which is initially much more greatly tensioned (1700 N instead of 692 N for the spokes the set opposite the freewheel).

Furthermore, measurements (not shown) also show that the torque loading affects the crossed spokes, depending upon whether or not they extend in the direction of the force to be transmitted to the rim.

For a rear wheel, the so-called tension spokes are tensioned again during the transmission of the torque and the so-called non-tension spokes loosen.

During use of the cycle, these three wheel loading methods combine and become cumulative. The diagrams show that for each spoke, the tension thereof varies around the initial tension. However, it is this repeated loading cycle that damages the spoke with fatigue. The fatigue strength of a tested spoke biased in alternate tension is a function of the maximum stress as well as of the loading amplitude.

The service life of a spoke that is biased in tension only is thus reduced as a function of the amplitude and also of the maximum stress which increases with the initial tension of the spokes.

Any increase in the initial tension of a spoke therefore shortens the service life thereof.

A modeling shows that the reduction of 1300−970=330 N in the tension of the spokes on the freewheel side represents a drop of only 620−462=158 N in the tension of the spokes on the side opposite the freewheel and multiplies by 10 the service life of the wheel.

Contrary to the preconceived notion of one of ordinary skill in the art, reducing the spoke tension would make it possible to considerably improve the endurance, not only of the spokes, but also of the rim and the hub which are subject to exactly the same loading cycles as the spoke.

This observation brings about the concept according to the invention that, contrary to the generally accepted ideas, a wheel need not be overly tensioned to be durable, although it must nevertheless be sufficiently tensioned in order not to loosen during normal use.

According to the invention, the spokes are designed to take up a compressive force in order to lower the initial tension of each spoke, and to reduce the disadvantages associated with overly tensioned spokes.

In practice, each spoke is provided so as not to buckle under a significant compressive force (greater than 150 N, for example), and comprises, at each end, bilateral connections that make it possible to transmit both a compression and tension force without play.

Figure 3:
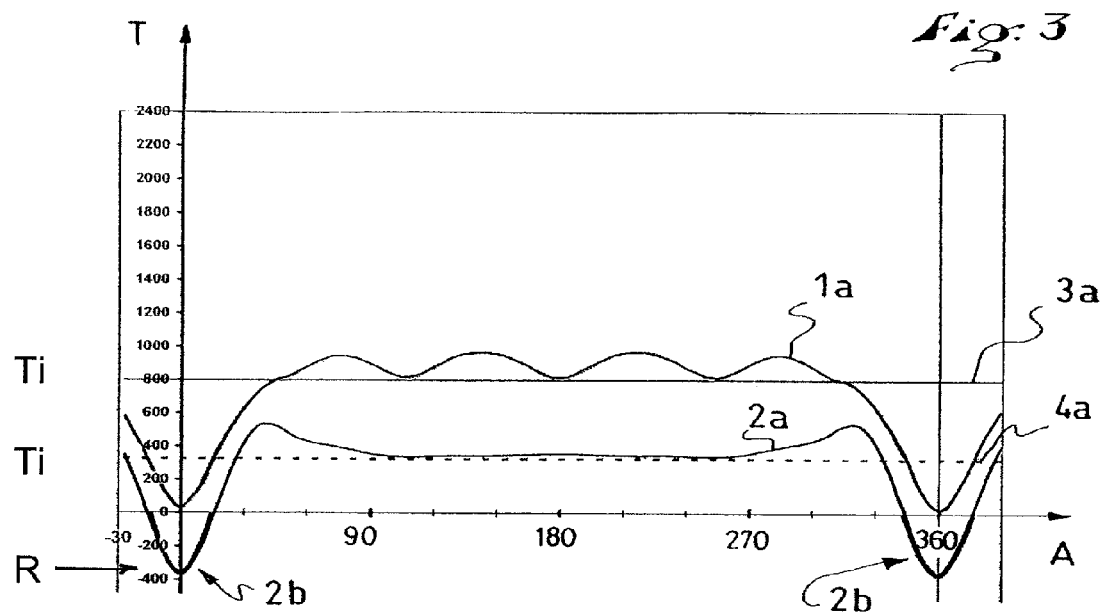
FIGS. 3 and 3a are views similar to FIGS. 1 and 2 for a wheel according to the invention.
Figure 3A:
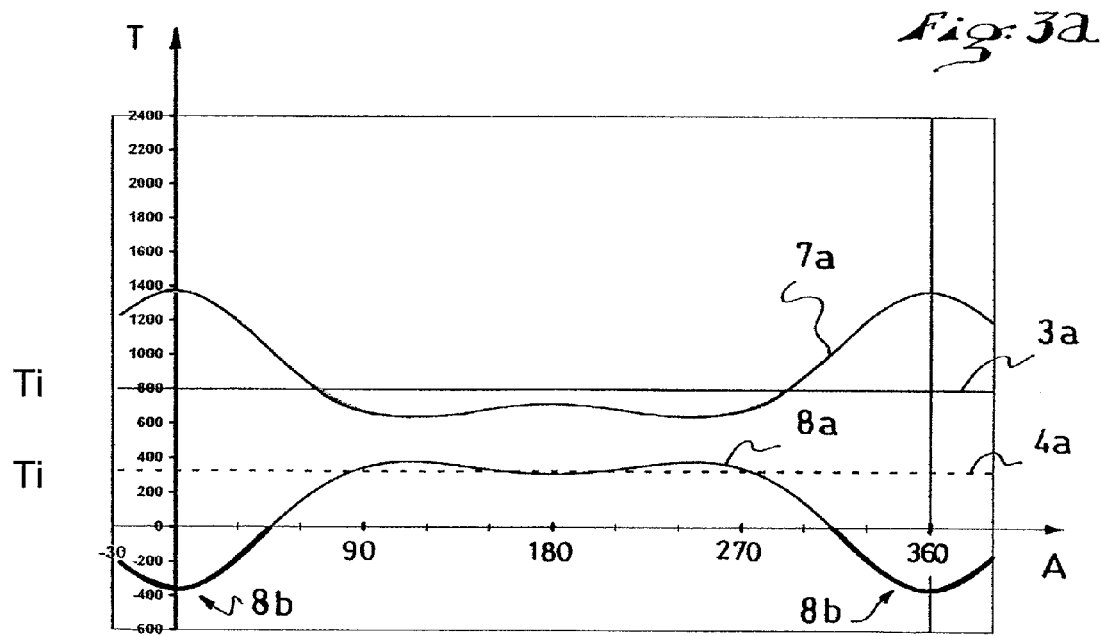

In addition, the wheel is tensioned to initial tension values $T_i$ that are lower than the tension values $T_n$ of a conventional wheel, and in particular to an initial tension $T_i$ that is reduced from the conventional value $T_n$ in the amount of the compressive force R, which the spoke resists without buckling. Thus, according to the invention, $T_i=T_n-R$. FIGS. 3 and 3a show the diagrams of tension variation in the spokes according to radial and lateral loading methods, respectively, for a wheel according to the invention. The same reference numerals used in FIGS. 1 and 2, but to which reference character "a" is appended, are used for the curves of FIGS. 3 and 3a, illustrating the variations in spoke tension on the freewheel side and on the side opposite the freewheel. In this regard, for example, FIGS. 3 and 3a show curves 1a and 2a.

If FIGS. 1 and 2 are compared to FIGS. 3 and 3a, the curves of the latter are seen to be lowered along the y-axis. Absent any external load, the spokes are stressed in tension but to a level below that of the current state of the art. In practice, the initial tension $T_i$ of the spokes on the freewheel side is at 800 N (see straight line 3a), or less than that of a conventional wheel (i.e., 1700 N; see straight line 3—FIGS. 1 and 2), and that of the spokes on the side opposite the freewheel is at 325 N (see curve 4a), or less than half that of FIGS. 1 and 2 (i.e., 692 N; see straight line 4). Under the effect of a high external load, in particular a radial load, or of a sum of external loads (see curves 2a and 8a), the stress of at least part of the spokes, namely, those located on the side opposite the freewheel, changes its operational sign temporarily, i.e., it becomes a compressive stress (2b, 8b). Arrangement is made so that the structure of the spokes in question is capable of withstanding a cycle of tensile and compression stresses without loosening or buckling so that not a single time during its loading cycle does a spoke fail to fulfill its role of connection between the rim and the hub.

According to one embodiment for the wheel 16 of FIG. 4, the spokes involved are the spokes 26 located on the side opposite the freewheel due to their tension that is initially below that of the spokes 27 located the freewheel side. It is generally considered that for a rear wheel, the spokes 26 located on this side are substantially twice less tensioned than the spokes 27 of the other set. Because the spokes 27 are more tensioned that the spokes 26, the initial tension levels, in a particular embodiment according to the invention, are adjusted so that the stress in the spokes 27 remains a tensile stress within the range of external load allowable for the wheel. However, this is not limiting, and the wheel can be constructed such that the spokes 26, 27 of the two sets are all capable of temporarily withstanding a compressive stress without loosening or buckling, and not only the spokes 26 located on the side opposite the freewheel.

The same is true for a wheel comprising asymmetrical spoke sets, due to the presence of a braking disk in the area of the hub.

A wheel with two symmetrical spoke sets is described further below.

By way of a non-limiting illustration, according to the invention, a wheel is built, such as the wheel 16, with spokes 26 initially tensioned (i.e., value Ti) to 325 Newtons, and spokes 27 initially tensioned to 800 Newtons; the spokes 26 withstand a compression load R of at least 367 N (i.e., 692 N–325 N). See FIG. 3. In comparison, conventional wheels of this type are initially tensioned to 1700 Newtons (line 3) on the freewheel side, and 692 Newtons (line 4) on the opposite side (see FIG. 1).

In this case, the invention thus makes it possible to reduce the tension forces on the spokes approximately by half, resulting in a significant increase in the service life, and significant decrease in the occurrence of geometry problems (jump, lateral run-out or deformation, etc).

According to one embodiment, the structure of the spokes 26 located on the side opposite the freewheel enables them to withstand, without buckling, a compressive stress R of at least 150 Newtons that is exerted between the two spoke ends along the longitudinal direction defined by the spoke body. The particular compressive stress value which the spokes 26 can withstand can be different. In the previously described example, but in a non-limiting manner, the spokes 26 can withstand a load of 367 N, and in the example described below in connection with FIG. 5, the spoke can withstand a load greater than 400 N without buckling.

Furthermore, the spokes have a tensioning device, such as a micrometric device located between the two attachment ends, in order to adjust their initial tension. The most commonly used device is of the screw/nut type. One characteristic of this tensioning device is that the screw and the nut are never forcibly tightened against one another, contrary to an assembly device. The screw or the nut can always be turned with respect to one another to increase or decrease tension in the spoke.

Also, the attachment connection between the spoke ends, the rim, and the hub is a bilateral connection, i.e., it is capable of working in tension as well as in compression, with an auxiliary device for neutralizing play in the connection, and which is capable of withstanding at least the compressive stress that has been set for the spoke structure.

Figure 5:
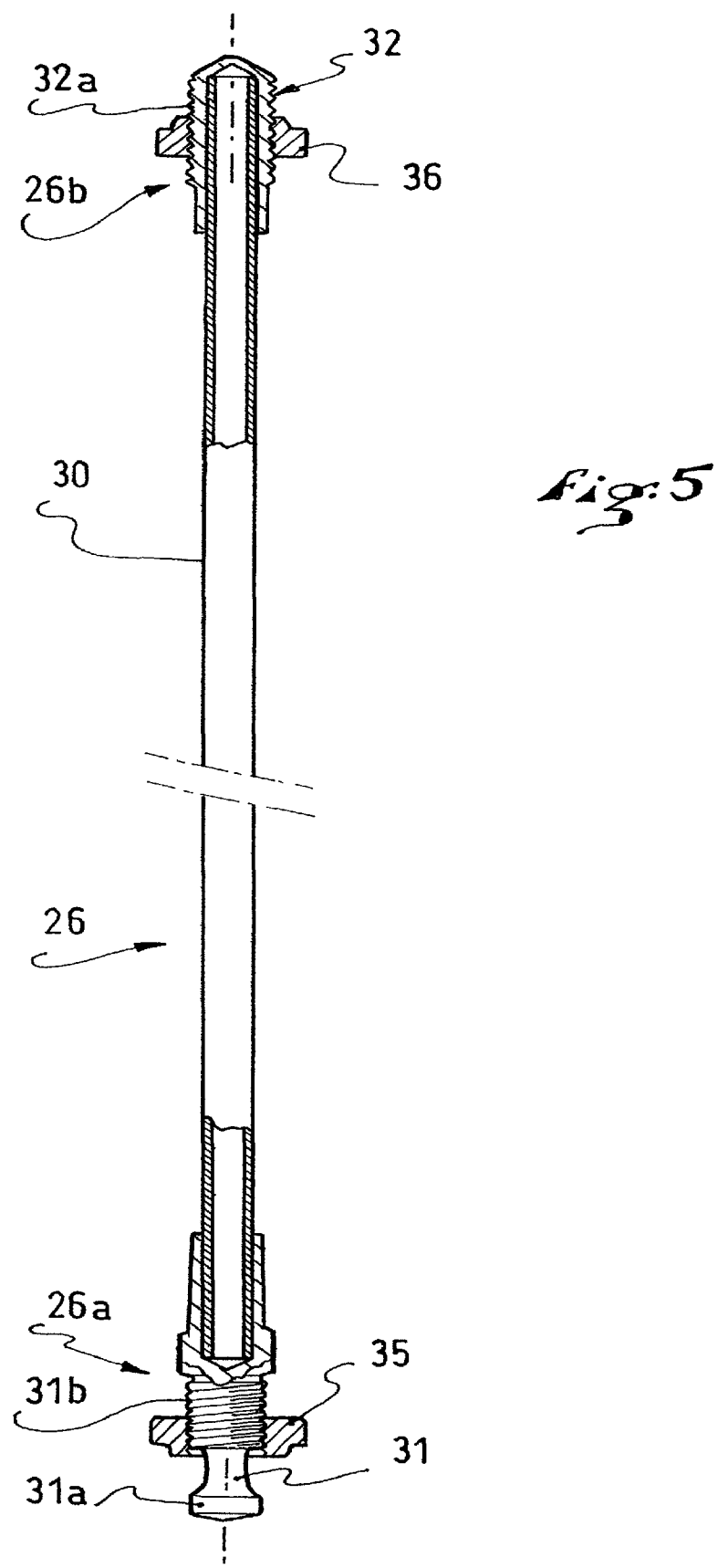
FIG. 5 is a partial cross-sectional view of a spoke according to a first embodiment of the invention.
Figure 8:
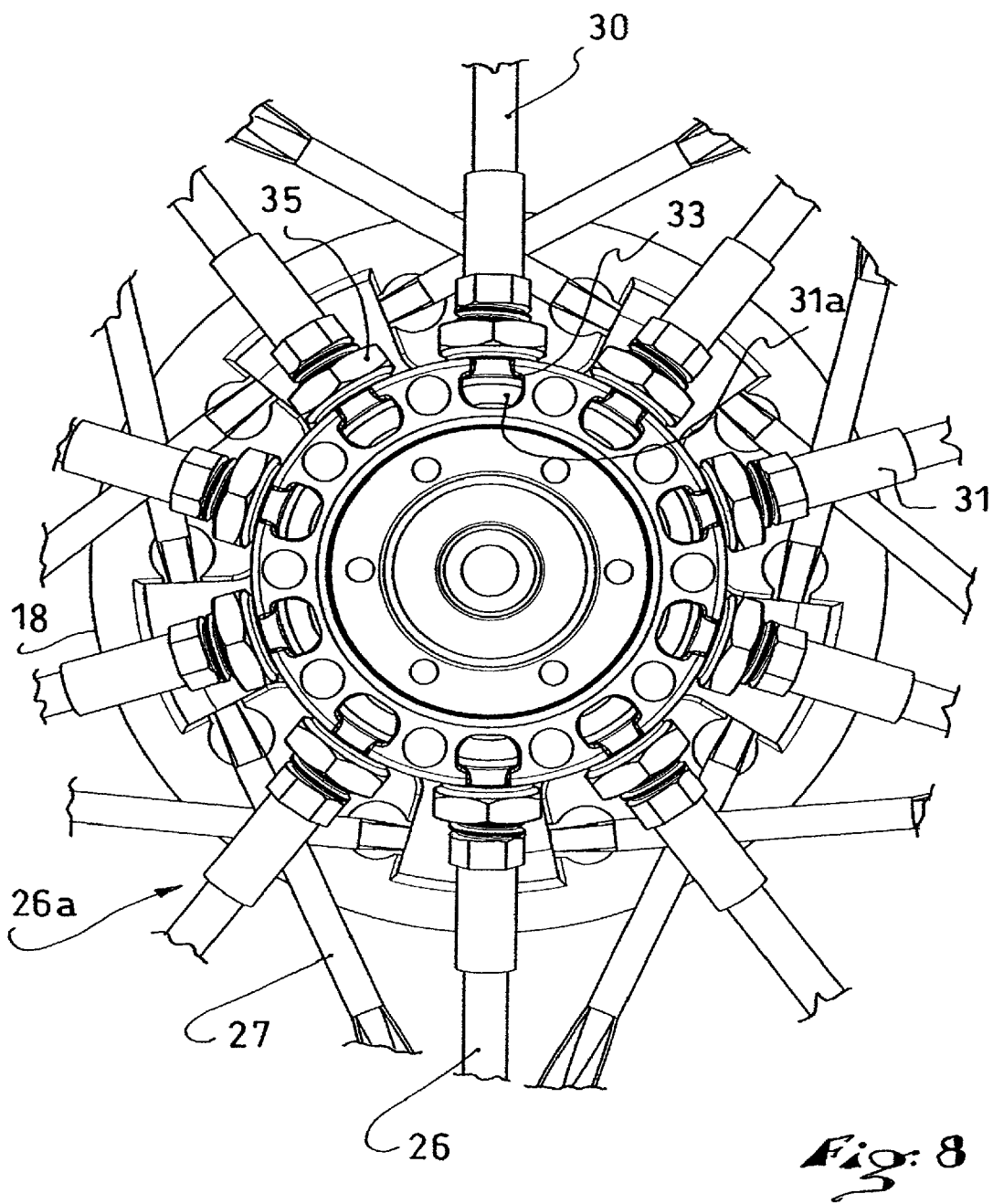
FIG. 8 shows the hub seen from the side opposite the freewheel.

FIG. 5 shows the structure of a spoke 26 according to a first mode of construction. The spoke shown includes an elongated body 30 extended at each one of its ends by an attachment head 31 and 32.

The structure of the spoke 26 enables it to withstand a tensile force as well as a compressive force. In particular, it is provided to withstand a tensile force greater than that of a conventional spoke (2800 N), and it has a buckling strength greater than 150 Newtons, and in this case greater than 400 N.

According to the illustrated embodiment, the spoke body 30 is formed as by a hollow cylindrical tube. A spoke having a solid cylindrical shape can be utilized, the advantage of a tubular spoke being its buckling strength/weight ratio. The tube is made out of any suitable metallic or composite material. Advantageously, the tube is made out of carbon fibers embedded in a resin matrix. Any appropriate resin is suitable, for example an epoxy or polyester resin. For example, a tube is made by extrusion of pultruded carbon fibers, portions of which are then cut out to the desired length. Carbon has a high modulus of elasticity and a low density compared to a metal alloy such as stainless steel or magnesium or aluminum alloy. In its composite form (very high bending modulus), it is very rigid in tension/compression, and thus bending, and is also very lightweight, which ensures that it has good buckling strength.

To improve the spoke buckling strength, the cross section of the body 30 is large compared to the size of a conventional spoke. By way of example, the tube that forms the body is 4 millimeters in diameter, and has a wall thickness between 0.5 and 1 millimeter. Comparatively, a conventional stainless steel spoke has a wire diameter that is less than or equal to 2 millimeters (in general, a diameter between 1.2 and 2.3 mm). The body cross section here is circular; this is not limiting, and other shapes can also be used for the cross section. Such a hollow beam-shaped spoke has a stiffness in bending that is much greater than that of a normal solid spoke with an equivalent cross section.

In the field of strength of materials, the compressive force which a straight beam can withstand before buckling is a function of the attachment structure of its ends, the Young's modulus of the beam material, the minimum quadratic moment of the beam cross section, and the length of the beam between the force application points.

The maximum allowable compressive force is given by the following relation:

$$F = \pi^2 EI/(KL)^2 \text{(Euler's formula)}$$

where K is a coefficient that is a function of the attachment construction of the ends, K=0.5 for a beam having two embedded ends, K=1 for a beam having two ends assembled with a ball joint type connection, K=2 for a beam having an embedded end and a free end, K=4 for a beam having two free ends, E indicates the Young's modulus of the beam material in MegaPascals, I is the quadratic moment of the beam in $mm^4$, for example, $I=a^4/12$ for a beam having a square cross section with a side a (mm), L is the length of the beam between its bearing point and the compressive force application point.

By way of comparison, according to the equation given above, a prior art stainless steel spoke having a diameter of 2 millimeters (E=195 GigaPascals) and a length of 280 mm has a buckling strength of 22 N, if its ends are assembled with a ball joint type connection, which is closer to reality. For a flat spoke, the values are even lower (about 7 N).

A tubular spoke made of pultruded carbon (E=115 GPa) 4 mm in diameter, and 280 mm in length has a buckling strength of 715 N under the same conditions if its ends are embedded, and 179 N if its ends have a ball joint type connection. Such a tubular carbon spoke is much lighter than a steel spoke while allowing a compression load about eight times greater. The type of connection at the spoke ends plays an important role, since it is capable of having an effect in a ratio of one to four.

Towards each of its ends, the spoke body 30 is extended by an attachment head 31, 32. According to the illustrated embodiment, the heads 31 and 32 are formed by two end pieces attached in the extension of the body. The ends of the body 30 are fitted in the end pieces 31, 32 and are assembled without play by any appropriate means, in particular an adhesive, a pin, screwing or any other technique. The mode of assembly by fitting and gluing provides good tensile and compressive strength to the connection between the body and its end pieces. Therefore, the large diameter of the spoke body makes it possible to carry out a strong assembly by gluing, due to the large circumference of the tube and thus of the large gluing surface having an equivalent cross section.

In the example described, the structure of the spoke enables it to withstand a compressive stress of 400 N, therefore of at least 150 Newtons. This allowable compressive load can still be increased by embedding the spoke ends in the rim and the hub.

The end pieces are provided to be fastened to the rim, on one side, and to the hub, on the other side. Moreover, there is a device for tensioning the spoke, such as a micrometric device, along the spoke length.

According to the first exemplary illustrated embodiment, and with particular reference to FIG. 7, the attachment head 31 has a widened cross section 31a, which is provided to be embedded and retained within a housing 33 machined in the body of the hub 18, and which comprises a threading 31b above this widened cross section. Reference to a widened cross section 31a of the attachment head 31, above, refers to the size of the periphery of a cross section transverse to the length of the attachment head being enlarged compared to a cross section of the attachment head immediately adjacent the head 31, thereby facilitating the retention of the head within the housing 33.

The other attachment head 32 has a threaded end 32a provided to be screwed into a housing 34 of the rim. The housing 34 has the shape of an internally threaded passage, as is described, for example, in the patent document EP 818 328. Its tension at rest is adjusted by means of the head 32, which is screwed more or less deeply into the housing 34 of the rim, thus modulating the initial tension of the spoke.

Any other appropriate connection means could also be used.

To allow the spokes to switch between tension and compression loading without allowing buckling or loosening, a neutralization device is provided between the end pieces, the rim, and the hub. According to the embodiment shown, this device includes, toward the head 31, a counter-nut 35, or locknut, that is capable of cooperating with the threading 31b, and toward the head 32, a counter-nut 36, or locknut, that is capable of cooperating with the threading 32a. These two locknuts 35, 36 are threaded on the outside of the end pieces 31 and 32; and they are tightened against the hub on one side and against the rim on the other side. Thus, they neutralize connection play, i.e., they eliminate any play in the connection which may be found between them, i.e., between the head 31 of the spoke 26 and its housing 33, or between the threaded head 32 and its housing 34, i.e., in the case of the spoke changing between being under tensile loading and being under compressive loading during use.

The assembly is carried out in the following manner. The spoke 26 is assembled to the hub by means of the head 31; the tension of the spoke is adjusted by means of the head 32 at the rim-side of the spoke. Then, the possible operational clearances are neutralized by means of the nuts 35 and 36, which are tightened against the hub and the rim, respectively. These locknuts also improve the connections of the spoke ends and contribute to increasing its allowable compressive load before buckling.

The spoke 26 can thus withstand a tensile or compressive load equally well, without loosening or buckling, and it can ensure a permanent connection between the hub and the rim under a lower tension.

Because the spokes 26 are less tensioned, the spokes 27 of the other set (freewheel side) are also less tensioned and, in this case, practically tensioned one-half as much. Nevertheless, because the set of spokes 27 is more flattened than the set of spokes 26, the spokes 27 are subject to a positive tension throughout their loading cycle (see FIG. 3). Because the spokes 27 are not compressed, they can thus have a conventional structure. For example, they can be constructed in accordance with what is described in the patent document EP 896 886. Any other construction method is also suitable.

Because the rim is less biased by the spoke tension, the stresses to which it is subjected are lower. Therefore, the service life of the wheel is extended. The same remark is valid for the hub.

The rigidity of the wheel is not modified by this reduction in the spoke tension. Indeed, at any time during their respective loading cycle, all of the spokes establish a mechanical connection between the rim and the hub, including the less-tensioned spokes due to their bilateral connection. At no time do any of them buckle or loosen, provided that the external loads remain within an allowable range of magnitude. This reduction in tension of at least part of the spokes makes it possible to reduce the disadvantages of a tension spoke wheel, and enables in particular the following:

a substantial reduction in the rim compression,
a smaller decrease in the rim perimeter,
an increase in the strength of the rim,
a reduction in the polygonal effect,
a reduction in the lateral run-out effect or deformation that is produced;
an increase in the fatigue strength.

Figure 9:
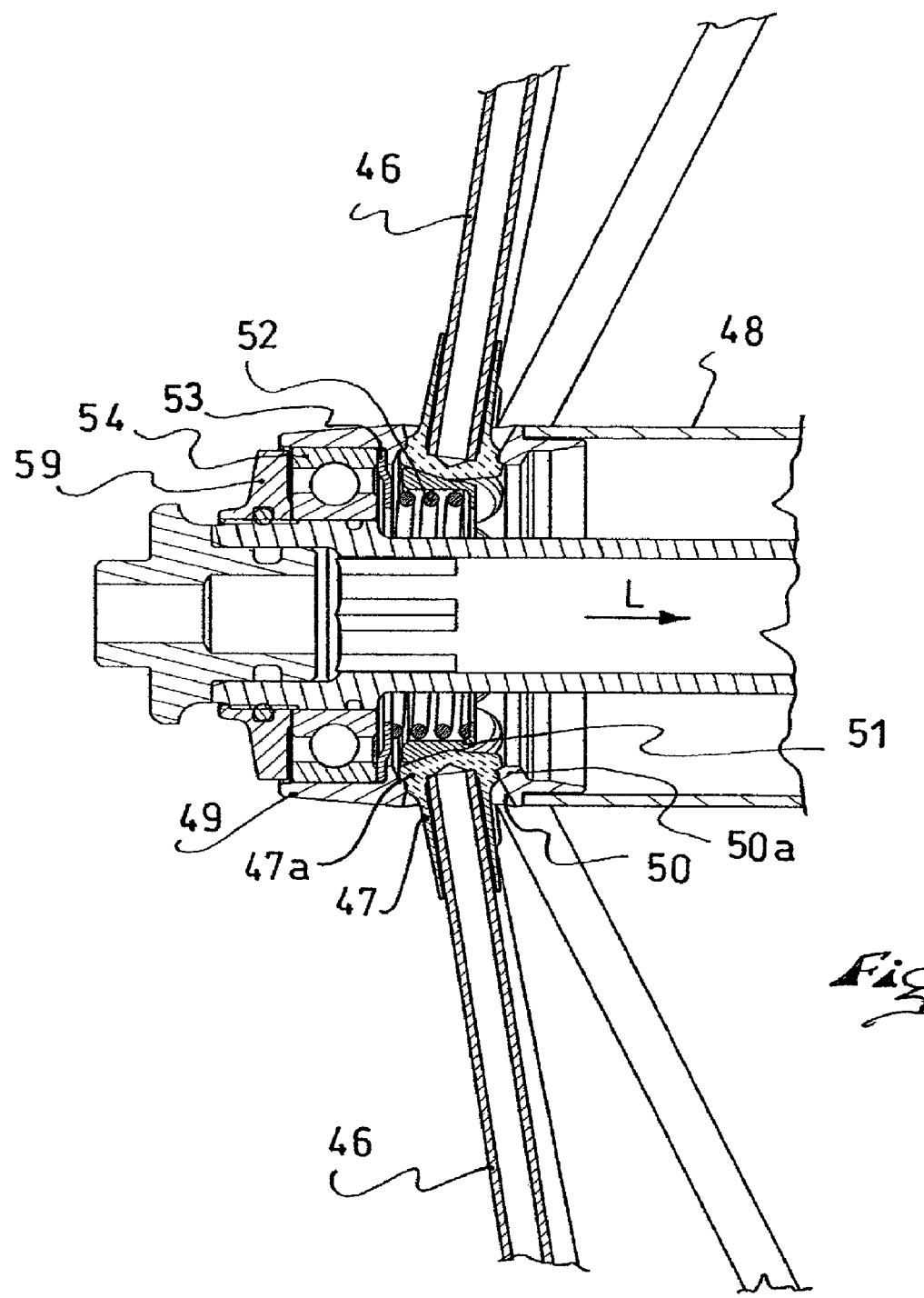

FIG. 9 relates to an alternative construction. According to this alternative, the spokes 46, which are capable of withstanding a compressive stress, are attached to the hub 48 by means of an end piece 47 that has a widened head 47a. As in the preceding case, for example, the body of the spoke 46 is fitted and glued in the end piece 47.

The spokes 46 are attached to the hub 48 on the wall of a lateral bulb 49, or cap, which has truncated openings 50 in which the spokes 46 are inserted, such that the widened head 47a is retained within the bulb 49 by an inner edge 50a of the opening 50. A truncated ring 51 is engaged in the bulb, beneath the widened heads of the spokes 46. In a non-limiting arrangement, a compression spring 52 is supported on a washer 53, resting against the force-fitted outer ring of the bearing 54, which exerts a pre-stress on the ring 51 along the longitudinal direction L. An end cap 59 is positioned adjacent the bearing 54. The spring 52 exerts a pre-stress on the ring 51 in the direction L of engagement of its truncated abutment surface beneath the widened heads of the spokes 46. Thus, the ring 51 maintains the widened heads in support against the edge 50a of the inlet of the openings 50. The connection between the spokes 46 and the hub is made bidirectional by this ring 51. Moreover, a compressive bias exerted on the hub by one of the spokes 46 is not capable of displacing the ring 51, in view of the angle of taper of its truncated surface, and of the bias exerted by the spring. The ring 51 neutralizes the play of the spokes at their connection with the hub.

Figure 10:
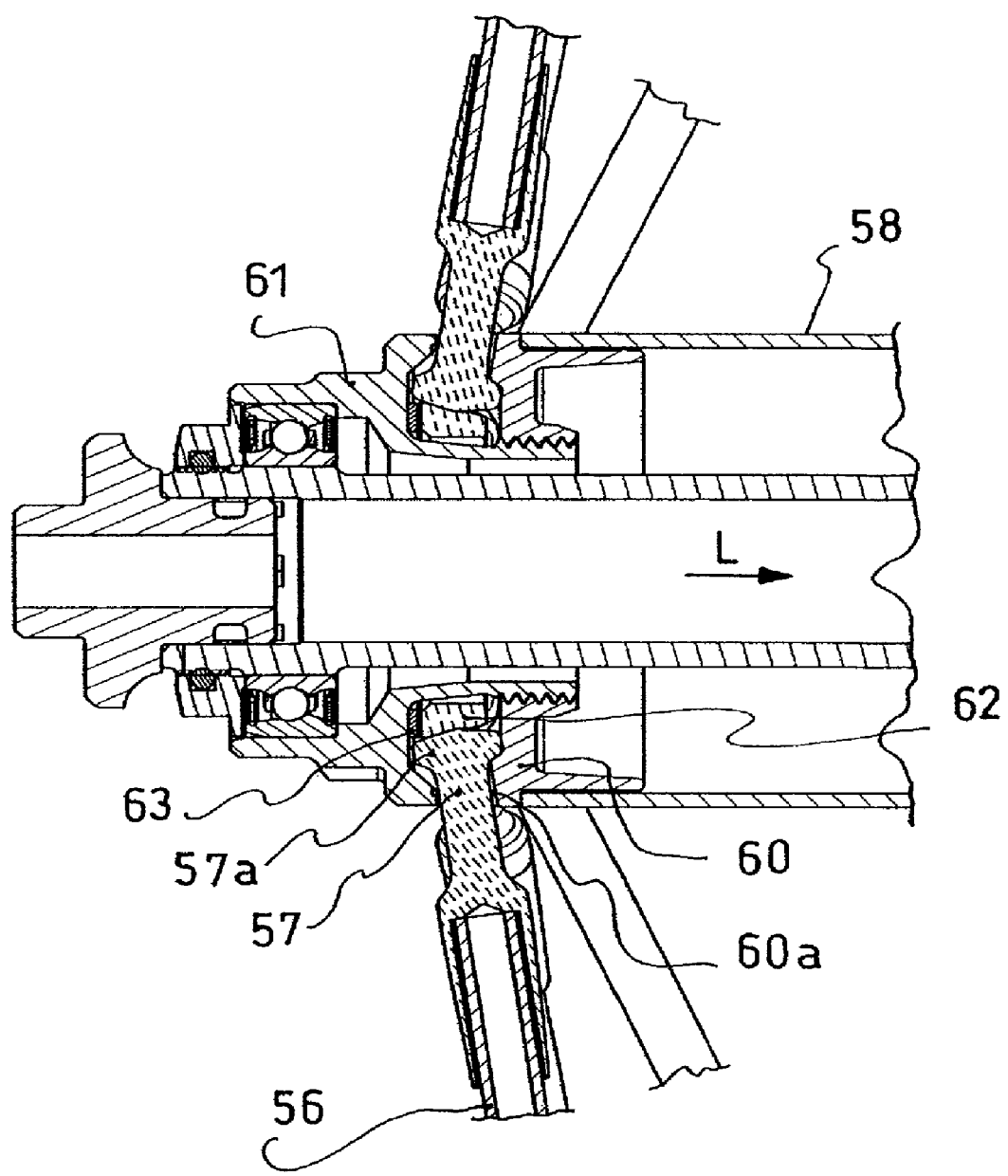

According to the alternative of FIG. 10, the spoke 56 is ended on the side of the hub 58 by an end piece 57 provided with a widened head 57a. The widened heads 57a are retained in a bulb 60, or cap, having opened notches 60a that open out towards the outside of the hub. The spokes 56 can thus be positioned by mere engagement in the notches 60a, without it being necessary to insert them. The notches are closed by a bell 61 that is screwed onto the bulb 60. As in the preceding case, a truncated ring 62 is engaged in the bulb beneath the widened heads 57a, and the truncated ring is constrained by an elastic washer 63, along the longitudinal direction L, which is itself constrained by the bell 61. This embodiment enables an easier assembly and disassembling of the spokes 56.

Alternatively, the ring 62 could be made out of an elastically deformable material, such as elastomer, so that the screwing of the bell 61 in the bulb 60 compresses the elastomeric ring 62 longitudinally, which causes its radial expansion and guarantees that the heads 57 are pressed flat against the inside of the bulb 60. The important thing is for the ring 62 to maintain each head 57a in support against the bulb 60 and to resist any compressive bias which a spoke could transmit thereto within the allowable value range.

Figure 11:
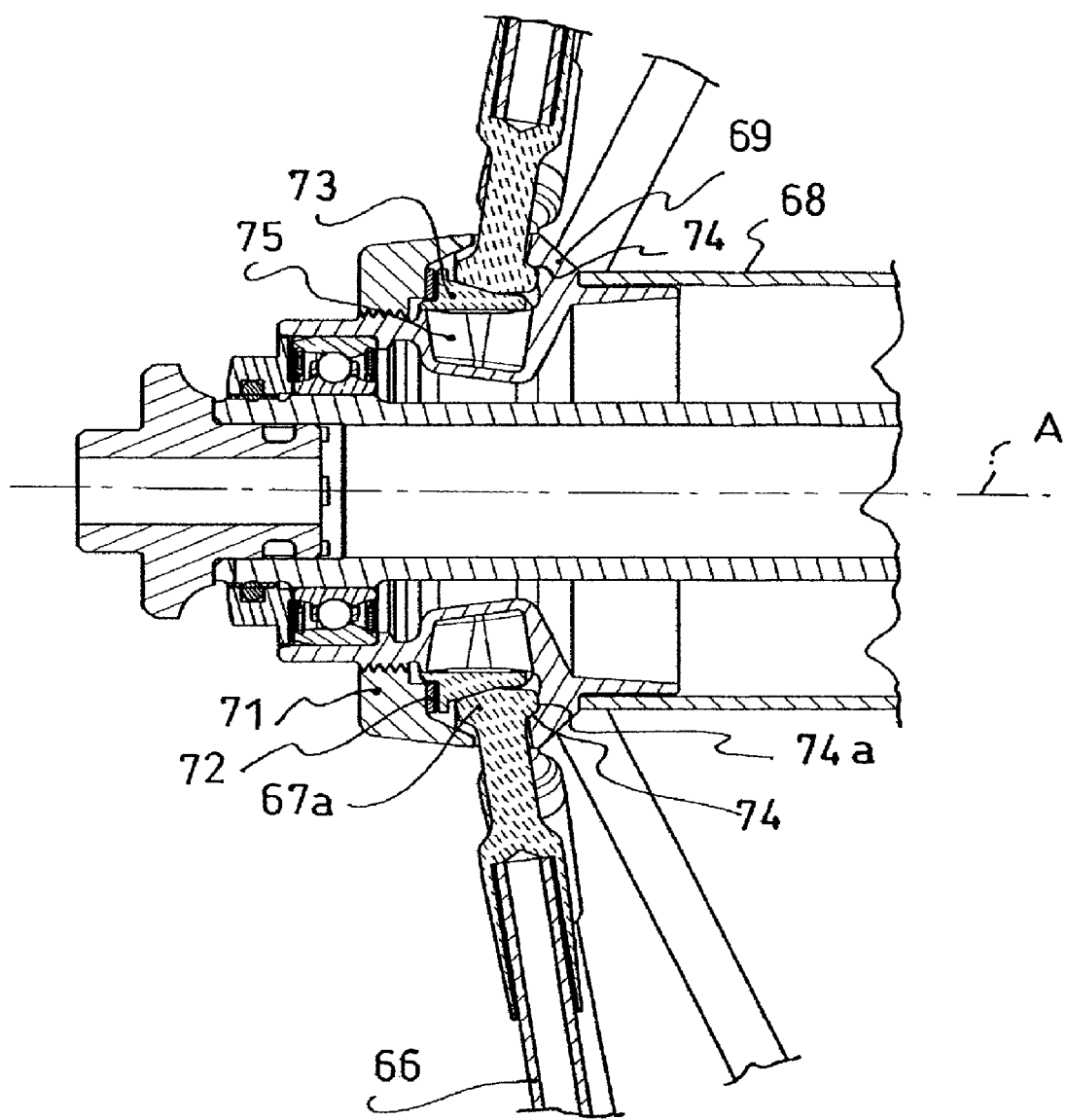

According to the example of FIG. 11, the widened heads 67a of the spokes 66 are retained in the open notches 74 of the bulb 69, or cap, of the hub 68. The notches are closed by a bell 71 that is screwed on the end of the bulb 69, and which pre-stresses a truncated ring 73 by means of an elastic washer 72. As previously described, the truncated ring maintains the widened heads 67a against a return 74a of the opening of the notches 74, which ensures a bidirectional connection between them, the spoke and the hub, with neutralization of the connection mechanical play. Across each of the notches, the bulb has machined recesses 75 in the direction of the axis A of the hub, in which the widened heads 67a are housed temporarily to permit the screwing or unscrewing of the other end of the spoke. Because the spoke body is rigid, it is indeed necessary to be capable of translating it along its axis when the tensioning device is being screwed or unscrewed.

According to the embodiment of FIGS. 12 and 13, the bulb 79, or cap, of the hub 78 is machined with buttonhole-shaped openings 80. The widened head 77a of a spoke 76 is attached to the bulb 79 by insertion in the wide part of the buttonhole, and it is retained in the narrow portion. As previously described, a truncated ring 83, pre-stressed by an elastic washer 84 and a screw-threaded bell 85, maintains the widened heads 77a in support against the opening of the buttonholes, thus ensuring a bidirectional connection between the spoke and the hub, with neutralization of the mechanical play in this area.

Figure 14:
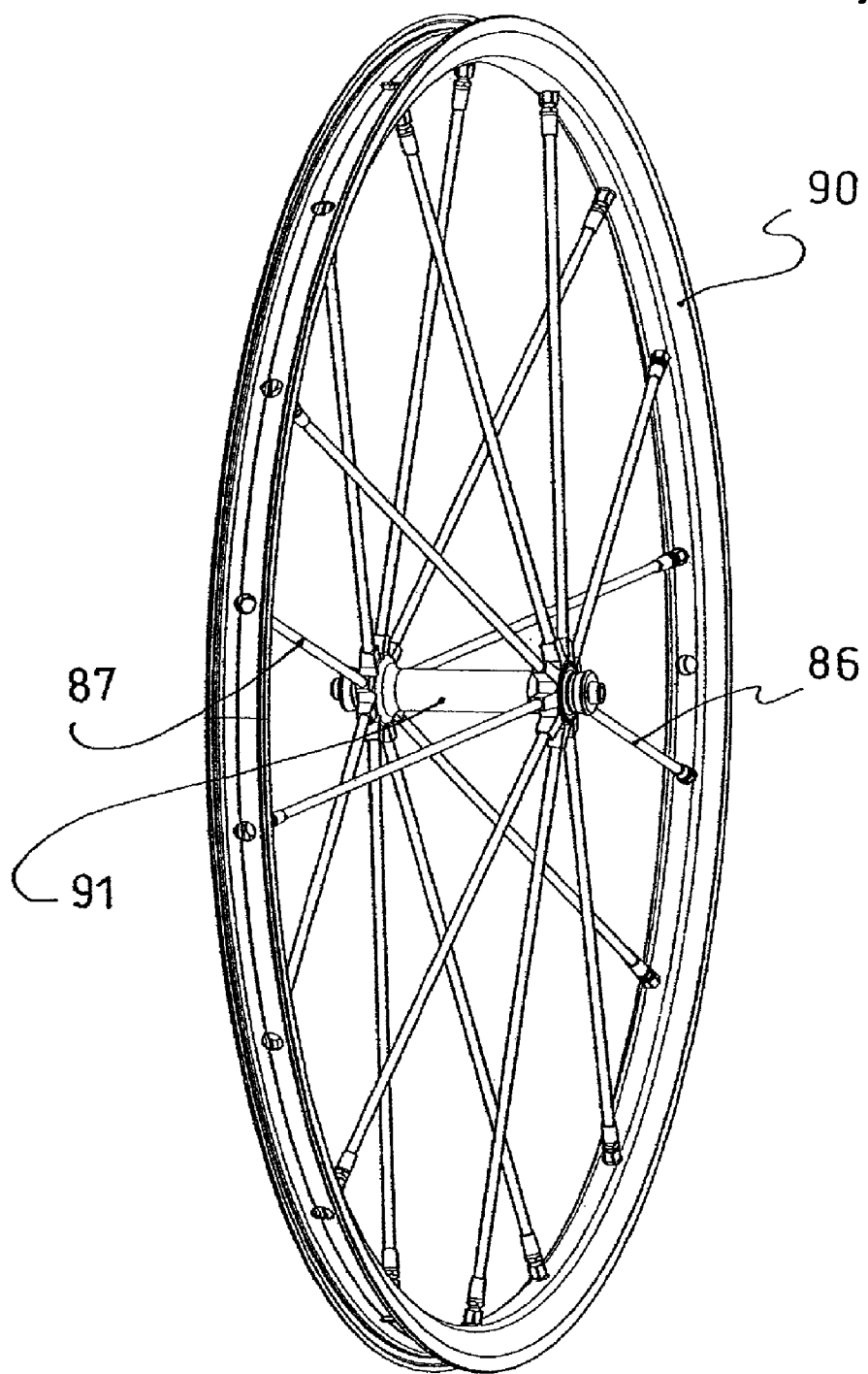
FIG. 14 is a perspective view of a front wheel according to another embodiment of the invention.

FIG. 14 is a perspective view of a front wheel, in which the spokes 86 and 87 of the two sets are arranged symmetrically between the rim 90 and the hub 91. The spokes 86 and 87 of the two sets are arranged radially, which is a usual mode of constructing a front wheel. However, this is not limiting, and other spoke patterns can also be used. According to the embodiment shown, the spokes 86 and 87 have a structure that makes them capable of being biased in tension as well as in compression. The spokes 86 and 87 are tensioned initially to a tension level lower than that of a conventional tension spoke wheel. By way of example, a front wheel of this type has been built with a spoke tension of 400 Newtons. In comparison, the tension of the spokes varies between 700 and 1400 Newtons for a conventional wheel.

Figure 17:
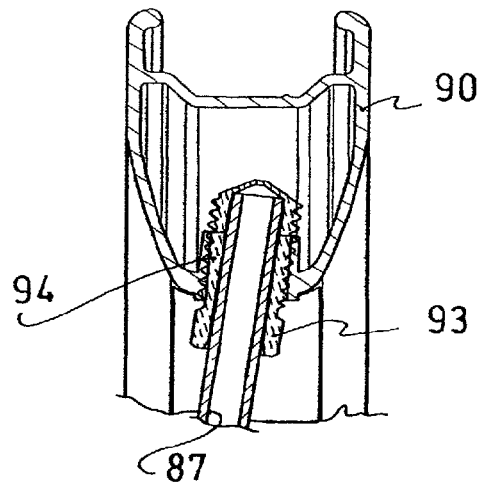
FIG. 17 illustrates the attachment of the spokes to the rim.
Figure 15:
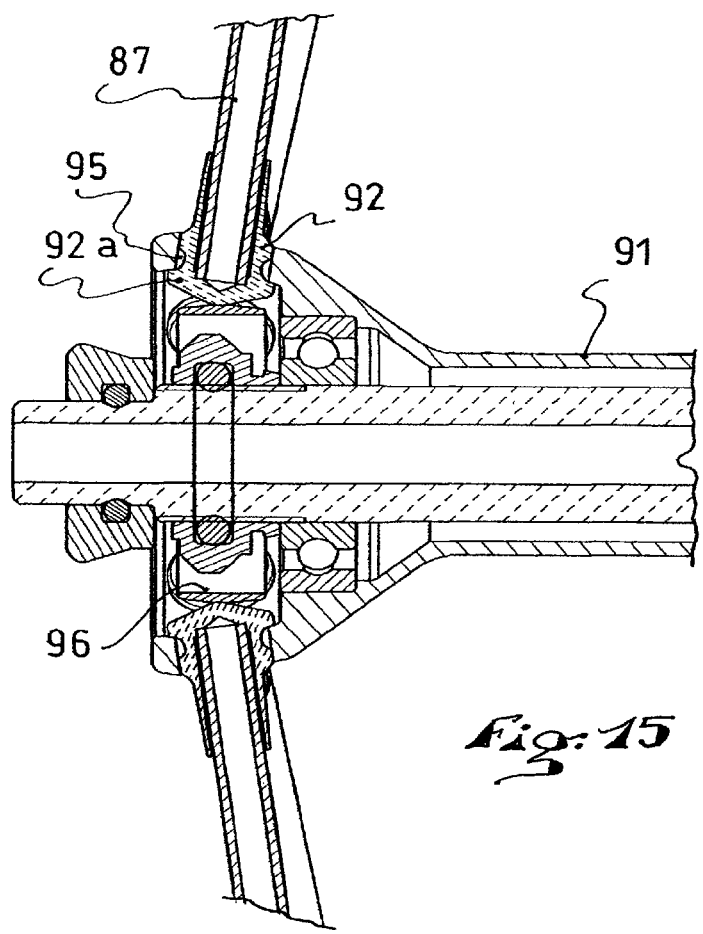
FIG. 15 illustrates the attachment of the spokes to the hub.
Figure 16:
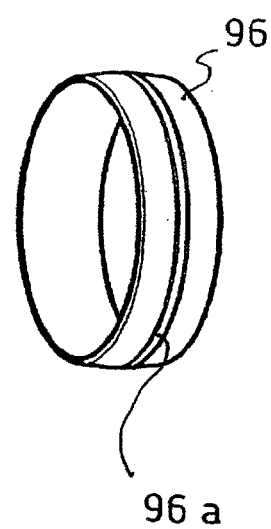
FIG. 16 shows a perspective view of the ring that retains the spoke attachment heads in the area of the hub.

FIGS. 15, 16, and 17, with reference to a spoke 87, illustrate a particular mode of constructing and attaching spokes designed, for example, for a front wheel. As previously described, the spoke 87 has a tubular body made, for example, of carbon fibers embedded in a resin matrix. Each end of the body is affixed in an end piece 92 and 93, respectively, via which the spoke is attached to the hub 91 and to the rim 90.

The end piece 92 has a widened head 92a which is retained in an opening 95 of the body of the hub 91. The widened heads 92a are maintained in support against the openings 95 by means of a ring 96. The outer surface of the ring is chamfered on both sides of a circular groove 96a, in which the tip of each widened head 92a is housed once the ring is positioned. The size of the ring is determined so that such an engagement occurs by forcing slightly on the ring. Thus, once the ring is positioned, it is maintained stable in this position.

The ring is constructed with some elasticity to enable it to be forcibly engaged by becoming slightly deformed between two successive widened heads 92a. In addition, the ring is built to resist a compressive force which a widened head 92a could transmit thereto due to a spoke compressive bias resulting from an external load.

For example, the ring is made of a plastic or composite material, such as acetal resin, or an aluminum or spring steel alloy. Other materials could also be used.

The end piece 93 for connection with the rim has a threaded end, and it is provided to be screwed into one of the chimney-shaped openings of the rim, as the end piece 32 which was described in connection with FIG. 5.

The mechanical play in the connection is neutralized here by techniques similar to those used to increase friction in the devices for tensioning the spokes and to prevent an ill-timed loosening. For example, additives, such as the adhesive 94 or any other equivalent product deposited on the screw threads, can be used in order to fill the space between the surfaces opposite the threads, such as polyamide, for example, such as known under the trade name Tuflock, or Nylock. In a particular configuration according to the invention, this space is filled on the side opposite the tension force. A threaded zone can also be deformed locally, as is described in patent document EP 1101631. These devices must have sufficient strength to oppose a compressive stress transmitted by the spoke body within the allowable range. Other techniques can also be used. The spokes 86 are attached to the rim and the hub in the same manner as has just been described relative to a spoke 87.

The assembly of the wheel is carried out in the following manner The spokes are positioned in the area of the hub 91; their tension then is adjusted by screwing the threaded end pieces 93 more or less in the openings of the rim. Once the initial tension has been adjusted, the ring 96 is positioned in the bulb, or cap, of the hub, beneath the widened heads 92a, in order to immobilize the widened heads with respect to the hub.

Figure 19:
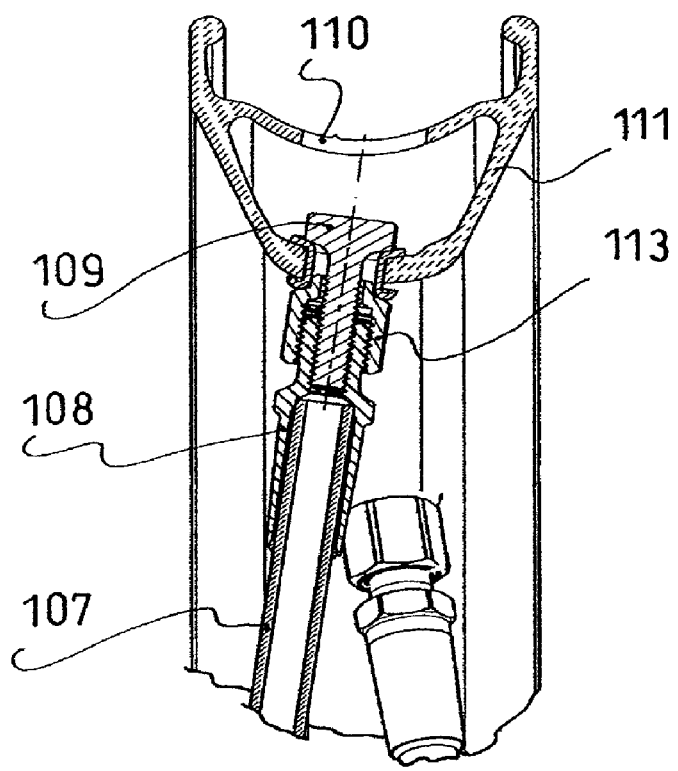
FIG. 19 shows the attachment of the spoke to the rim for this embodiment.
Figure 18:
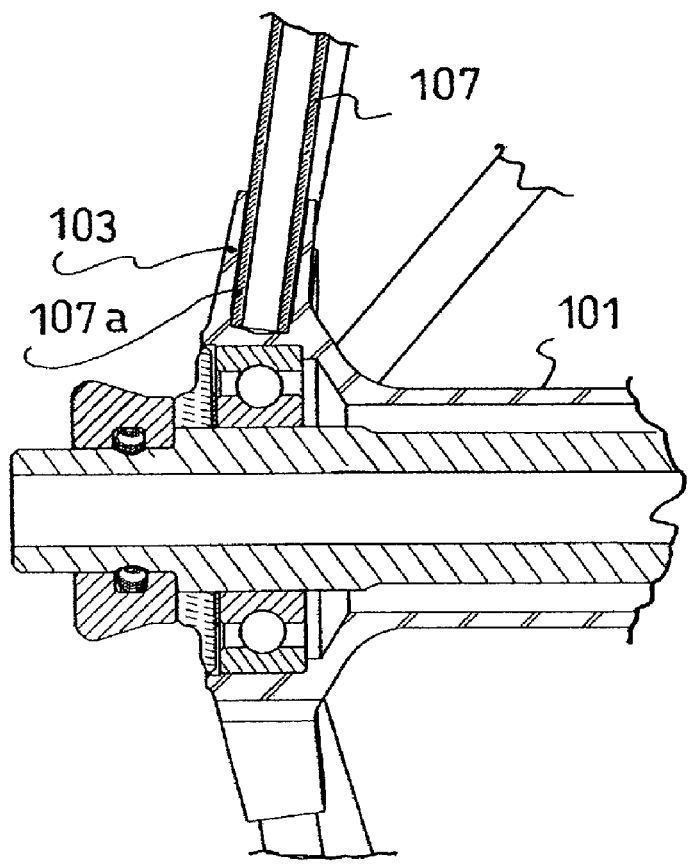
FIG. 18 is related to an alternative attachment of the spokes to the hub.

FIGS. 18 and 19 illustrate an alternative construction. According to this alternative, the body of the hub 101 has radial arms 103; each arm has a central recess in which the end 107a of a spoke 107 is fitted and assembled by any appropriate means, in particular an adhesive. Thus, the spoke 107 is attached to the hub directly, without intermediate attachment end piece. The spoke end 107a here forms the head for attaching the spoke to the hub. The adhesive or the equivalent assembly means ensures a neutralization of the connection play in the area. In this case, the hub can be made in two or three independent portions.

However, this mode of attachment does not permit a rotation of the spoke which previously occurred during tension adjustment. FIG. 19 shows a manner of attaching the spoke to the rim, which respects this constraint. The end of the spoke 107 is extended by an end piece 108 that is assembled by any appropriate means, in particular by fitting and an adhesive. The end of the end piece 108 has a central recess that is threaded in order to receive a tension-adjusting screw 109. The screw 109 is accessible from outside the rim via an opening 110 made in the upper bridge of the rim 111. Its head is retained in the area of the lower bridge and, in a non-limiting arrangement, it is supported by an eyelet crimped in the wall of the bridge. It forms a head for attaching the spoke. The head of the screw 109 has any appropriate configuration allowing for coupling to a tightening tool. Thus, the tension of the spoke 107 is adjusted by more or less turning the screw 109 in the end piece 108 using such a tool. Preferably, a form of coupling to a tool, with a square or hexagonal shape, or of the Torx type, for example, can be provided on the periphery of the end piece 108, and which makes it possible, using a wrench, to retain the end of the spoke in order to avoid any twisting bias resulting from friction between the screw and the end piece.

To neutralize the mechanical play in the connection between the spoke and the rim, the end of the end piece 108 is threaded on the outside, and a counter-nut 113, or locknut, is tightened against the rim by taking support on this threading. Thus, the spoke 107 is assembled to the hub and the rim by bidirectional connections, and with neutralization of the mechanical play of the connection, each spoke is able to withstand a cycle of tensile and compressive biases without loosening or buckling.

Figure 20:
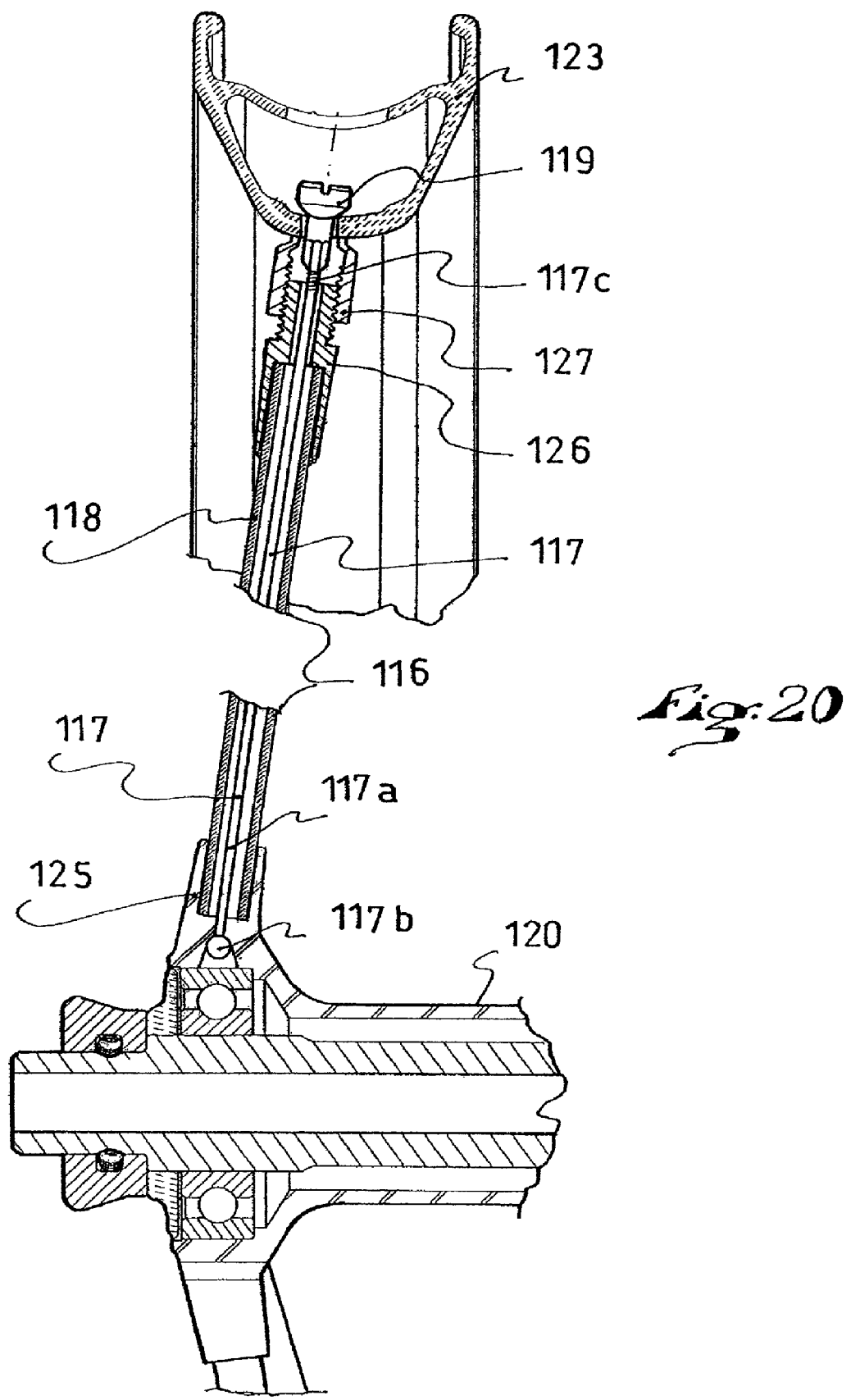
FIG. 20 is a partial cross-sectional view which illustrates another embodiment of the invention.

FIG. 20 relates to an alternative construction, in which the spoke 116 includes a central core 117 provided to be biased in tension, and a tubular outer sheath 118 through which the core 117 extends, and which is provided to work in compression. For example, the central core 117 is constructed like a conventional metal spoke; it includes a tapered body 117a, an attachment head 117b retained in the hub body 120, and a threaded end 117c on which a spoke nipple 119 is screwed. The nipple 119 extends through the lower bridge of the rim 123, the nipple head is retained by the lower bridge, and it is accessible from outside the rim through a piercing of the upper bridge. The nipple head 119 forms the head for attaching the spoke to the rim.

The sheath 118 is a tubular element having a first end fitted in an arm 125 of the body of the hub 120. Its other end is fitted in an end piece 126 that is extended by a threaded end. A threaded bush 127 is screwed on this last threaded end. The top of the bush 127 is provided to come in support against the lower bridge of the rim 123, at the periphery of the hole through which the nipple 119 extends.

As in the preceding case, it is possible to provide a form enabling coupling to a holding or tightening tool at the periphery of the end piece 126 and of the bush 127.

The nipple 119 and bush 127 are adjusted so that the mechanical play is non-existent, and so that the residual bias that these elements exert on the rim is a tensile bias, when at rest, i.e., the tensile pre-stress of the core 117, is greater than the compressive pre-stress of the sheath 118.

Thus, the core 117 and the sheath 118 establish a bidirectional connection of each end of the spoke with the rim or the hub. Moreover, under the effect of an external load, these elements are capable of transmitting a compressive bias between the hub and the rim without loosening or buckling of the spoke. Because the sheath 118 is constantly subjected to a compressive bias, fitting its ends is optional; a mere support is also suitable.

Figure 21:
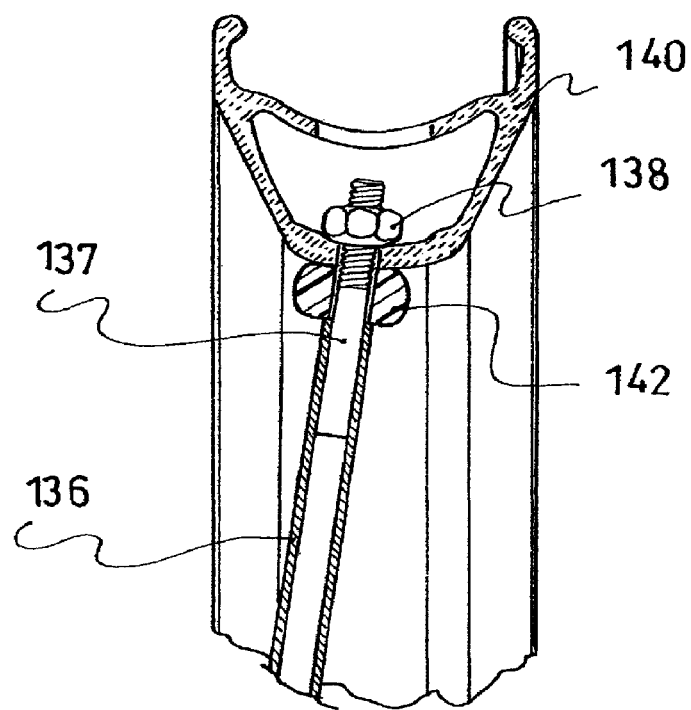
FIG. 21 shows another method of attaching a spoke to the rim.

FIG. 21 shows an alternative construction. The body of the spoke 136, which is a tubular body, is extended at its end by an attachment portion 137 assembled to the body 136 by any appropriate means, such as an adhesive, for example. The end of the attachment portion 137 is threaded to enable it to be assembled to the rim 140 with a nut 138, or any other appropriate attachment. The nut forms the head for attaching the end of the spoke to the rim.

An elastically deformable buffer 142 is positioned in abutment between the end of the tubular body of the spoke 136 and the rim 140. The attachment portion 137 extends through this buffer. The buffer 142 is compressed at the time the spoke 136 is being tensioned by means of the nut 138. Conversely, its material is sufficiently rigid to withstand a compressive bias, without deformation, within the allowable load range of the spoke in compression. Thus, the spoke tension can be adjusted, and the spoke is capable of withstanding a cycle of tensile bias and compressive bias without loosening or buckling, with neutralization of the connection play. The buffer can be replaced by one or more Belleville spring washers or a helicoidal compression spring.

Figure 22:
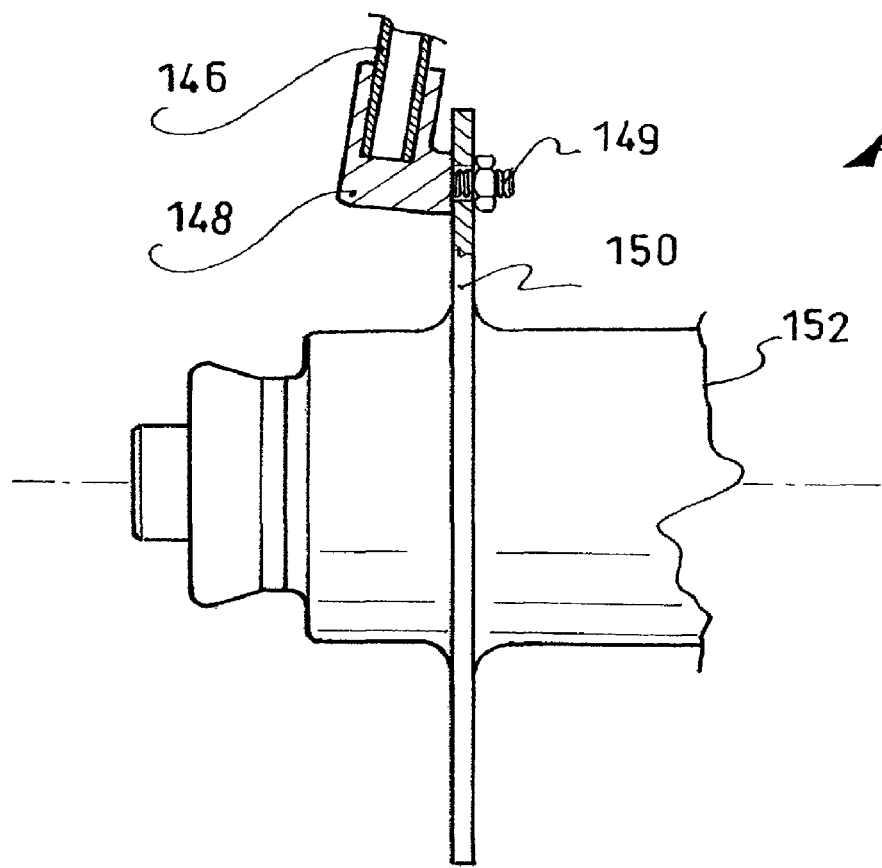
FIG. 22 illustrates another method of attaching the spoke to the hub.

The embodiments described above relate to straight spokes, the attachment ends of which are in the alignment of the body. This mode of construction is preferred for a better transmission of the compression biases. Nevertheless, it is not limiting. To illustrate this, FIG. 22 shows the end of a spoke 146 embedded in an end piece 148. The end piece 148 has a side extension 149 provided to be assembled by means of a nut to a radial disc 150 of a hub body 152. The end piece, with its side extension, forms the head for attaching the spoke to the hub. Such a mode of connection between the spoke and the hub is compatible with the invention because it ensures a connection without play in tension and compression between the spoke and the hub, provided that the end piece is assembled without play against the disc. Conversely, a connection with a radial disc which would be obtained by means of a conventional bent spoke end would not achieve the objective of the invention. Indeed, in any connection of this type, there exists a play, even minimal, which provides the spoke with a loosening phase during the switch from a tensile bias to a compressive bias.

Other alternative constructions could be adopted within the scope of the invention. In particular, a wheel could be constructed with a set of spokes having two groups of spokes, viz., a first group of conventional spokes, and a second group of spokes that are capable of withstanding tensile stress, the spokes of the two groups being distributed in a repetitive manner on the rim, for example one spoke out of two or three.

Also, it is to be understood that the embodiments described in relation to the construction of a rear wheel can also be applied to a front wheel, and conversely. The modes of attachment of the spoke to the rim and the hub could also be inverted.

Furthermore, the end pieces with the attachment heads could be fitted inside the spoke body instead of being fitted on the outside.

With respect to composite spokes, in particular, one can provide gluing the spoke in the area of the rim (composite or non-composite) and adjusting it in the area of the hub. In this case, the spoke adjustment can be general, i.e., collective to the spokes, and not individual. In the case of crossed spokes, one can also connect the spokes in the area of their crossing in order to push back the buckling limits.

The spoke does not necessarily have a constant cross section in the longitudinal direction, and it can have a cross section of variable form along the longitudinal direction; for example, a larger cross section in the median zone in order to resist buckling more efficiently.

Finally, the invention also covers a rolling apparatus, in particular a cycle which would be equipped with a wheel that is at least consistent with what has been described herein. Conventionally, a cycle includes a frame, two wheels, and a transmission system.

The invention claimed is:

1. A spoked wheel comprising:
a peripheral rim;
a central hub;
spokes extending between the rim and the hub, the spokes being under tension in an absence of an external load;
each of at least a plurality of the spokes having a structure providing a compression buckling strength to withstand buckling up to a predetermined compression force (R);
a tension-adjusting arrangement structured and arranged to adjust the tension of at least the plurality of spokes, the tension of the plurality of spokes being set at an initial tension force (Ti);
said initial tension force (Ti) comprising a normal tension force (Tn) reduced by said compression force (R), said normal tension force (Tn) being a tension whereby, when the wheel is subjected to an external radial load of a predetermined amount, a variation in tension of the plurality of spokes, during a revolution of the plurality of spokes around the hub, has a minimum tension force of zero.

2. A spoked wheel according to claim 1, wherein:
the wheel is a rear wheel, the central hub having a freewheel side and a side opposite the freewheel;
the plurality of spokes having a structure to withstand buckling up to a predetermined compression force (R) are spokes extending between the rim and the side opposite the freewheel.

3. A spoked wheel according to claim 1, wherein:
the compression force (R) the plurality of spokes is capable of withstanding is at least 150 Newtons.

4. A spoked wheel according to claim 1, wherein:
the spokes are arranged in two spoke sets, spokes of a first of said two spoke sets extend between the rim and a first side of the hub and spokes of a second of said two spoke sets extend between the rim and a second side of the hub;
the two spoke sets are not symmetrical, a second of the two spoke sets having a larger dish angle than the first of the two spoke sets;
the plurality of spokes capable of withstanding a compression force (R) are spokes of the second of the two spoke sets.

5. A spoked wheel according to claim 1, wherein:
the tension-adjusting arrangement to adjust the tension of the plurality of spokes is arranged on ends of the spokes in connection with the rim.

6. A spoked wheel according to claim 1, wherein:
the tension-adjusting arrangement to adjust the tension of the plurality of spokes is arranged on ends of the spokes in connection with of the hub.

7. A spoked wheel according to claim 1, wherein:
the tension-adjusting arrangement to adjust the tension of the plurality of spokes is arranged at the hub;
each of the spokes of the plurality of spokes is attached to the rim by means of an attachment head between an end of the spoke and the rim, the attachment head being threadedly engaged with the rim.

8. A spoked wheel according to claim 1, further comprising:
a connection play neutralizing device structured and arranged to neutralize connection play of at least one end of each spoke of the plurality of spokes capable of withstanding the compression force (R).

9. A spoked wheel according to claim 1, wherein:
each spoke of the plurality of spokes withstanding the compression force (R) comprises:
a body defining a longitudinal direction;
two attachment heads, each of the two attachment heads extending from the body, a first of the attachment heads being attachable to the hub and a second of the attachment heads being attachable to the rim;
the body having a structure capable of withstanding, without buckling, the compression force (R) applied between the two attachment heads along the longitudinal direction of the spoke.

10. A spoked wheel according to claim 9, wherein:
each spoke of the plurality of spokes includes at least one tension-adjusting device, said device being structured and arranged to apply a tension force along a length of the body between the two attachment heads.

11. A spoked wheel according to claim 9, wherein:
the attachment heads are formed by two attached end pieces assembled at each of opposite ends of the spoke body.

12. A spoked wheel according to claim 9, wherein:
one of the two attachment heads includes a head widened in cross section transverse of a length of the attachment head.

13. A spoked wheel according to claim 9, wherein:
one of the two attachment heads includes a threaded end.

14. A spoked wheel according to claim 9, further comprising:
a connection play neutralizing device structured and arranged to neutralize connection play of at least one end of each spoke of the plurality of spokes capable of withstanding the compression force (R).

15. A spoked wheel according to claim 14, wherein:
the connection play neutralizing device is a locknut threaded onto one end of a spoke.

16. A spoked wheel according to claim 14, wherein:
the body of each spoke of the plurality of spokes is tubular;
the connection play neutralizing device is an elastically deformable buffer positioned in abutment at an end of the tubular body of the spoke, an attachment portion at the end of the spoke extending through the buffer, and a nut forming the attachment head is threaded on the end of the spoke.

17. A spoked wheel according to claim 14, wherein:
the connection play neutralizing device is an adhesive deposited on the device for tensioning the spoke or an end of the spoke.

18. A spoked wheel according to claim 9, wherein:
the spokes are arranged in two spoke sets, spokes of a first of said two spoke sets extend between the rim and a first side of the hub and spokes of a second of said two spoke sets extend between the rim and a second side of the hub;
the two spoke sets are not symmetrical, a second of the two spoke sets having a larger dish angle than the first of the two spoke sets;
the plurality of spokes capable of withstanding a compression force (R) are spokes of the second of the two spoke sets.

19. A spoked wheel according to the claim 14, wherein:
the connection play neutralizing device includes a ring housed within a body of the hub and in support against the attachment heads of the spokes.

20. A spoked wheel according to claim 19, wherein:
the ring has an abutment surface; and
an elastic device engages said abutment surface and prestresses the ring.

21. A spoked wheel according to claim 19, wherein:
the ring has an outer surface chamfered on each of two sides of a circular groove;
one of the two attachment heads has a head widened in cross section transverse of a length of the attachment head;
a point of each widened head is housed in the circular groove of the ring.

22. A spoked wheel according to claim 1, wherein:
each of the plurality of the spokes further comprising:
a body defining a longitudinal direction;
two attachment heads, each of the two attachment heads extending from the body, a first of the attachment heads being attached to the hub and a second of the attachment heads being attached to the rim;
the body having a structure capable of withstanding, without buckling, a compression force (R) applied between the two attachment heads along the longitudinal direction of the spoke.

23. A spoked wheel according to claim 22, wherein:
the structure of the body of the spoke is constructed and arranged to withstand, without buckling, a compression force (R) of at least 150 Newtons.

24. A spoked wheel according to claim 22, wherein:
said body is tubular.

25. A spoked wheel according to claim 24, wherein:
said tubular body comprises carbon fibers.

26. A spoked wheel according to claim 22, further comprising:
a core having an attachment head and a threaded end with a nipple; and
an external tubular sheath, the core extending through the sheath.

27. A rolling apparatus comprising:
a frame;
a transmission system; and
two wheels, at least one of the two wheels comprising:
a peripheral rim;
a central hub;
spokes extending between the rim and the hub, the spokes being under tension in an absence of an external load;
each of at least a plurality of the spokes having a structure providing a compression buckling strength to withstand buckling up to a predetermined compression force (R);
a tension-adjusting arrangement structured and arranged to adjust the tension of at least the plurality of spokes, the tension of the plurality of spokes being set at an initial tension force (Ti);
said initial tension force (Ti) comprising a normal tension force (Tn) reduced by said compression force (R), said normal tension force (Tn) being a tension whereby, when the at least one of the two wheels is subjected to an external radial load of a predetermined amount, a variation in tension of the plurality of spokes, during a revolution of the plurality of spokes around the hub, has a minimum tension force of zero.

28. A spoked wheel according to claim 1, wherein:
the tension-adjusting arrangement to adjust the tension of the plurality of spokes comprises a tension-adjusting mechanism arranged at a first of two opposed ends of each of respective ones of the plurality of spokes;
the second of the two opposed ends of each of the respective ones of the plurality of spokes has a connection structured and arranged to allow lengthwise movement between the respective spoke and one of the rim and the hub;
a connection play elimination device is structured and arranged for each of the respective ones of the plurality of spokes to prevent said lengthwise movement between each respective spoke and one of the rim and the hub when the wheel is subjected to said external load greater than said initial tension force (Ti).

29. A spoked wheel according to claim 1, wherein:
the external radial load of a predetermined amount is at least 1200 Newtons.

30. A rolling apparatus according to claim 27, wherein:
the external radial load of a predetermined amount is at least 1200 Newtons.

31. A method of making a spoked wheel according to claim 1, said method comprising:
assembling said plurality of spokes to the rim and to the hub;
setting the initial tension force (Ti) for each of the plurality of spokes to a value resulting from subtracting said compressive force (R) to which each of the plurality of spokes can withstand from a normal tension force (Tn);
said normal tension force (Tn) being a tension whereby, when the wheel subjected to an external radial load of a predetermined amount, a variation in tension of the plurality of spokes, during a revolution of the plurality of spokes around the hub, has a minimum tension force of zero.

32. A method of making a spoked wheel according to claim 1, said method comprising:
assembling said plurality of spokes to the rim and to the hub
setting the initial tension force (Ti) for each of the plurality of spokes to a value resulting from subtracting said compressive force (R) to which each of the plurality of spokes can withstand from a normal tension force (Tn);
said normal tension force (Tn) being a tension whereby, when the wheel subjected to an external radial load of at least 1200 Newtons, a variation in tension of the plurality of spokes, during a revolution of the plurality of spokes around the hub, has a minimum tension force of zero.

33. A spoked wheel according to claim 7, wherein:
each of the spokes of the plurality of spokes is attached to a respective attachment head by means of glue.

* * * * *